United States Patent
Yu

(10) Patent No.: US 10,296,649 B2
(45) Date of Patent: May 21, 2019

(54) MENTION SUGGESTION, AND INFORMATION PROCESSING METHODS AND SYSTEMS

(71) Applicant: Beijing Zhigu Rui Tuo Tech Co., Ltd, Beijing (CN)

(72) Inventor: Kuifei Yu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 245 days.

(21) Appl. No.: 15/115,661

(22) PCT Filed: Feb. 25, 2015

(86) PCT No.: PCT/CN2015/073252
§ 371 (c)(1),
(2) Date: Jul. 29, 2016

(87) PCT Pub. No.: WO2015/127887
PCT Pub. Date: Sep. 3, 2015

(65) Prior Publication Data
US 2017/0177728 A1    Jun. 22, 2017

(30) Foreign Application Priority Data
Feb. 25, 2014 (CN) .......................... 2014 1 0064278

(51) Int. Cl.
*G06F 17/30* (2006.01)
*G06Q 50/00* (2012.01)
*G06Q 10/10* (2012.01)

(52) U.S. Cl.
CPC ....... *G06F 17/30867* (2013.01); *G06Q 10/10* (2013.01); *G06Q 50/01* (2013.01)

(58) Field of Classification Search
CPC ... G06F 17/30867; G06Q 10/10; G06Q 50/01
(Continued)

(56) References Cited

U.S. PATENT DOCUMENTS 8,874,608 B2   10/2014  Song et al.
8,949,250 B1 *  2/2015  Garg ................... G06F 17/3053
                                          707/748
(Continued)

FOREIGN PATENT DOCUMENTS

CN    101743538 A    6/2010
CN    102033894 A    4/2011
(Continued)

OTHER PUBLICATIONS

Chinese Office Action dated Oct. 16, 2017 for Chinese Application No. 201410064278.5, 9 pages.
(Continued)

*Primary Examiner* — Evan Aspinwall
(74) *Attorney, Agent, or Firm* — Amin, Turocy & Watson, LLP

(57) ABSTRACT

Mention suggestion, and information processing methods and systems are provided, e.g., for social networking. A mention suggestion method comprises: in response to a mention symbol input by a user in a first social network, acquiring a first correspondence between a first user name set and a second user name set, and historical mention information of the user; and suggesting at least one first user name in the first user name set to the user according to the first correspondence and the historical mention information. The information processing method comprises: collecting historical mention information, of a user, on a first social network and another social network, or on another social network; and storing the historical mention information. User names can be suggested more accurately when a user needs to mention a user name, so as to improve an input speed of the user.

61 Claims, 15 Drawing Sheets

(58) Field of Classification Search
USPC .......................................................... 707/754
See application file for complete search history.

(56) References Cited

U.S. PATENT DOCUMENTS

| | | | | |
|---|---|---|---|---|
| 8,972,398 | B1* | 3/2015 | Bursey | G06F 17/30525 |
| | | | | 707/706 |
| 9,305,092 | B1* | 4/2016 | Finkelstein | G06F 17/3097 |
| 2008/0208812 | A1* | 8/2008 | Quoc | G06Q 10/10 |
| 2008/0255977 | A1* | 10/2008 | Altberg et al. | G06F 17/30979 |
| | | | | 705/35 |
| 2008/0294655 | A1 | 11/2008 | Picault et al. | |
| 2011/0078184 | A1* | 3/2011 | Song | G06Q 10/107 |
| | | | | 707/770 |
| 2011/0252027 | A1 | 10/2011 | Chen et al. | |
| 2012/0041907 | A1* | 2/2012 | Wang | G06Q 30/02 |
| | | | | 706/12 |
| 2012/0110096 | A1* | 5/2012 | Smarr | H04W 4/21 |
| | | | | 709/206 |
| 2012/0158720 | A1* | 6/2012 | Luan | G06F 17/30867 |
| | | | | 707/732 |
| 2012/0166999 | A1* | 6/2012 | Thatcher | G06Q 10/107 |
| | | | | 715/780 |
| 2012/0271831 | A1* | 10/2012 | Narayanan | G06F 17/30867 |
| | | | | 707/741 |
| 2013/0073627 | A1* | 3/2013 | Mehanna | G06F 17/30867 |
| | | | | 709/204 |
| 2013/0086057 | A1* | 4/2013 | Harrington | H04L 51/32 |
| | | | | 707/732 |
| 2013/0144854 | A1* | 6/2013 | Pantel | G06F 17/30867 |
| | | | | 707/706 |
| 2013/0159325 | A1* | 6/2013 | Polonsky | G06F 17/30424 |
| | | | | 707/754 |
| 2013/0191416 | A1* | 7/2013 | Lee | G06F 17/30979 |
| | | | | 707/771 |
| 2013/0218862 | A1* | 8/2013 | Ghosh | G06F 17/30728 |
| | | | | 707/706 |
| 2014/0122522 | A1* | 5/2014 | Ganapathy | G06F 17/30864 |
| | | | | 707/769 |
| 2014/0330809 | A1* | 11/2014 | Raina | G06F 17/2705 |
| | | | | 707/722 |
| 2014/0344265 | A1* | 11/2014 | Boucher | G06F 17/30867 |
| | | | | 707/732 |
| 2015/0088914 | A1* | 3/2015 | Zeng | H04L 67/22 |
| | | | | 707/751 |
| 2015/0227619 | A1* | 8/2015 | Xie | G06F 17/30864 |
| | | | | 707/706 |
| 2016/0203237 | A1* | 7/2016 | Whitnah | G06F 17/30646 |
| | | | | 707/722 |

FOREIGN PATENT DOCUMENTS

| | | |
|---|---|---|
| CN | 102143485 A | 8/2011 |
| CN | 102307242 A | 1/2012 |
| CN | 102448029 A | 5/2012 |
| CN | 10266310 A | 9/2012 |
| CN | 102890695 A | 1/2013 |
| CN | 102937995 A | 2/2013 |
| CN | 103150034 A | 6/2013 |
| CN | 103455515 A | 12/2013 |
| CN | 103838834 A | 6/2014 |

OTHER PUBLICATIONS

International Search Report for PCT Application No. PCT/CN2015/073252, dated May 15, 2015, 2 pages.

Eagle, et al. "Inferring friendship network structure by using mobile phone data". Proceedings of the National Academy of Sciences, Sep. 8, 2009, 106(36): pp. 15274-15278.

Laibowitz, et al. "A sensor network for social dynamics" Proceedings of the 5th international conference on Information processing in sensor networks. ACM, Apr. 2006: pp. 483-491.

* cited by examiner

MENTION SUGGESTION, AND INFORMATION PROCESSING METHODS AND SYSTEMS

RELATED APPLICATION

The present application is a U.S. National Stage filing under 35 U.S.C. § 371 of international patent cooperation treaty (PCT) application No. PCT/CN2015/073252, filed Feb. 25, 2015, and entitled "MENTION SUGGESTION, AND INFORMATION PROCESSING METHODS AND SYSTEMS", which claims the benefit of priority to Chinese Patent Application No. 201410064278.5, filed on Feb. 25, 2014, which applications are hereby incorporated into the present application by reference herein in their respective entireties.

TECHNICAL FIELD

The present application relates to the field of social networking technologies, and in particular, to mention suggestion, and information processing methods and systems.

BACKGROUND

Mention suggestion is a social networking function provided to make it convenient for users to mention their friends, and this function generally brings the following experience to users: when a user inputs a mention symbol (such as @) in a social network, or further inputs an incomplete user name (such as the first letter of the user name) following the mention symbol, the social network infers different degrees of intimacy between the user and different friends of the user according to historical data of the user on the current website, and then automatically suggests multiple possible user names; the user directly selects a corresponding user name, thereby improving an input speed of the user.

However, with the development of social networking, a real user generally registers on different social networks with different user names or nicknames. Therefore, a suggestion result provided by an existing social network merely according to historical data on the current website cannot fully reflect degrees of intimacy between the user and different friends. As a result, the suggestion result is usually significantly different from a user name that the user wants to input, which affects the input speed of the user.

SUMMARY

An example, non-limiting objective of the present application is to provide a mention suggestion technology.

According to a first example, non-limiting aspect, the present application provides a mention suggestion method, where the method comprises:
 in response to a mention symbol input by a user in a first social network, acquiring a first correspondence between a first user name set and a second user name set, and historical mention information of the user, where the first user name set comprises at least one first user name of a friend of the user in the first social network, and the second user name set comprises at least one second user name of the friend of the user in another social network; and
 suggesting at least one first user name in the first user name set to the user according to the first correspondence and the historical mention information.

According to a second example, non-limiting aspect, the present application provides a mention suggestion system, where the system comprises:
 a response module, configured to: in response to a mention symbol input by a user in a first social network, acquire a first correspondence between a first user name set and a second user name set, and historical mention information of the user, where the first user name set comprises at least one first user name of a friend of the user in the first social network, and the second user name set comprises at least one second user name of the friend of the user in another social network; and
 a suggestion module, configured to: suggest at least one of the first user names in the first user name set to the user according to the first correspondence and the historical mention information.

According to a third example, non-limiting aspect, the present application provides an information processing method, comprising:
 collecting historical mention information, of a user, on a first social network and another social network, or on another social network; and
 storing the historical mention information.

According to a fourth example, non-limiting aspect, the present application provides an information processing system, where the system comprises:
 a collection module, configured to collect historical mention information, of a user, on a first social network and another social network, or on another social network; and
 a storage module, configured to store the historical mention information.

The various mention suggestion methods, and the information processing methods and systems of the embodiments of the present application comprehensively consider interaction data of the user on different social networks with friends, and therefore, can reflect information such as a degree of intimacy of the user with each friend more comprehensively, so that when the user needs to mention a user name, user names are suggested more accurately, which, for example, helps improve an input speed of the user.

DETAILED DESCRIPTION

The following describes the example embodimentsof the present application in further detail with reference to the accompanying drawings and embodiments. The following embodiments are used for describing the present application, but are not intended to limit the scope of the present application.

A person skilled in the art may understand that, in the embodiments of the present application, the serial numbers of the following steps do not indicate the sequence in which the steps are executed, and the sequence in which the steps are executed should be determined according to functions and internal logic of the steps, but should not constitute any limitation to the embodiments of the present application.

In addition, terms such as "first" and "second" in the embodiments of the present application are used only to differentiate different steps, devices, or modules, but neither represent any specific technical content nor indicate any necessary logic sequences among the steps.

The "social network" in the present application refers to an online community created by a group of people having same interests and activities, and comprises but is not limited to Weibo, WeChat, QQ zone, forum, Facebook, Twitter, Renren, Baidu space, Kaixin, Douban, Zhihu, and 51 game community.

The inventor finds in research that, a friend of a user usually uses different names or nicknames when registering on different social networks; meanwhile, the user may interact with any user on different social networks. Therefore, if interaction data between the user and friends on different social networks can be considered comprehensively, information such as a degree of intimacy between the user and each friend can be reflected more comprehensively, so that when the user needs to mention a user name, user names are suggested more accurately, which helps improve an input speed of the user.

Figure 1:
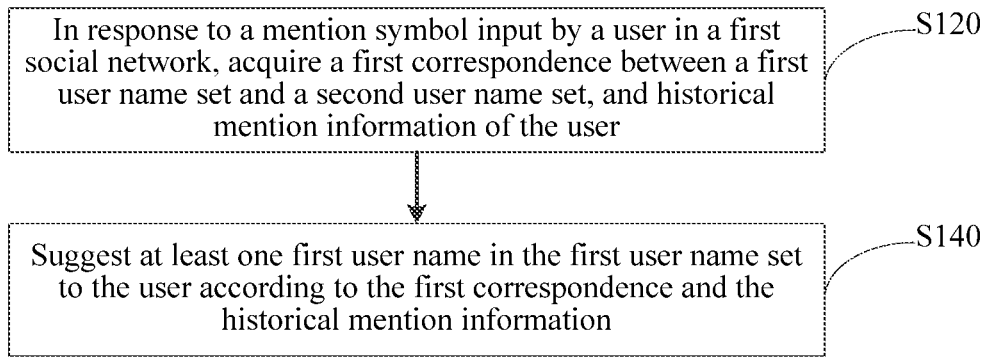
FIG. 1 is a flowchart of a mention suggestion method according to an example embodiment of the present application.

FIG. 1 is a flowchart of a mention suggestion method according to an embodiment of the present application. As shown in FIG. 1, the method comprises:

S120: In response to a mention symbol input by a user in a first social network, acquire a first correspondence between a first user name set and a second user name set, and historical mention information of the user, where the first user name set comprises at least one first user name of a friend of the user in the first social network, and the second user name set comprises at least one second user name of the friend of the user in another social network.

S140: Suggest at least one first user name in the first user name set to the user according to the first correspondence and the historical mention information.

The method considers other social networks apart from the first social network, acquires the first correspondence between the first user name set and the second user name set and the historical mention information of the user, and further suggests the corresponding first user name to the user according to the first correspondence and the historical mention information, thereby avoiding problems of incomprehensive information and low suggestion accuracy caused by suggestion that merely relies on the first social network.

Specifically, the mention symbol is a symbol representing that a user name is mentioned, and is usually put in front of the mentioned user name, for example, @ is generally used as a mention symbol in Weibo.

The first correspondence may be as shown in Table 1. The first social network is a social network in which the user is inputting information currently; assuming that the user is inputting information in Sina Weibo currently, Sina Weibo is the first social network. According to a user ID registered on Sina Weibo, it can be determined that friends of the user which need to be considered currently comprise: A, B, C, and D. The user may have other friends on other social networks apart from Sina Weibo, and these friends do not need to be considered because they will not be mentioned in Sina Weibo. The first user name set may comprise: A1, B1, C1, and D1. Other social networks in this example may comprise: Renren, WeChat, and QQ zone (or may comprise any one or two of Renren, WeChat, and QQ zone), and correspondingly, the second user name set may comprise: A2, B2, D2, A3, B3, C3, D3, A4, B4, C4, and D4. The friend C does not register on Renren, and has no corresponding user ID. The first correspondence is that: A1, A2, A3, and A4 correspond to the same friend A; B1, B2, B3, and B4 correspond to the same friend B; C1, C3, and C4 correspond to the same friend C; and D1, D2, D3, and D4 correspond to the same friend D. A person skilled in the art understands that, to establish the first correspondence, it is unnecessary to know real identities of the friends A, B, C, and D.

TABLE 1

| Friend | Sina Weibo user ID | Renren user ID | WeChat user ID | QQ zone user ID |
|---|---|---|---|---|
| A | A1 | A2 | A3 | A4 |
| B | B1 | B2 | B3 | B4 |
| C | C1 | / | C3 | C4 |
| D | D1 | D2 | D3 | D4 |

The historical mention information is all information in which the user mentioned friends thereof in history, for example, the user left a message "How many New Year's Day holidays do you have?@B4" on Sina Weibo on Jan. 1, 2010, and this message may correspond to a piece of historical mention information of the user.

In an example embodiment of the present application, the first correspondence between the first user name set and the second user name set, and the historical mention information of the user may be acquired locally, for example, loaded from a local memory of a device that executes the method.

In another example embodiment of the present application, the first correspondence between the first user name set and the second user name set, and the historical mention information of the user may be acquired externally by using a network, for example, downloaded by a device that executes the method from cloud or a network server.

Figure 2:
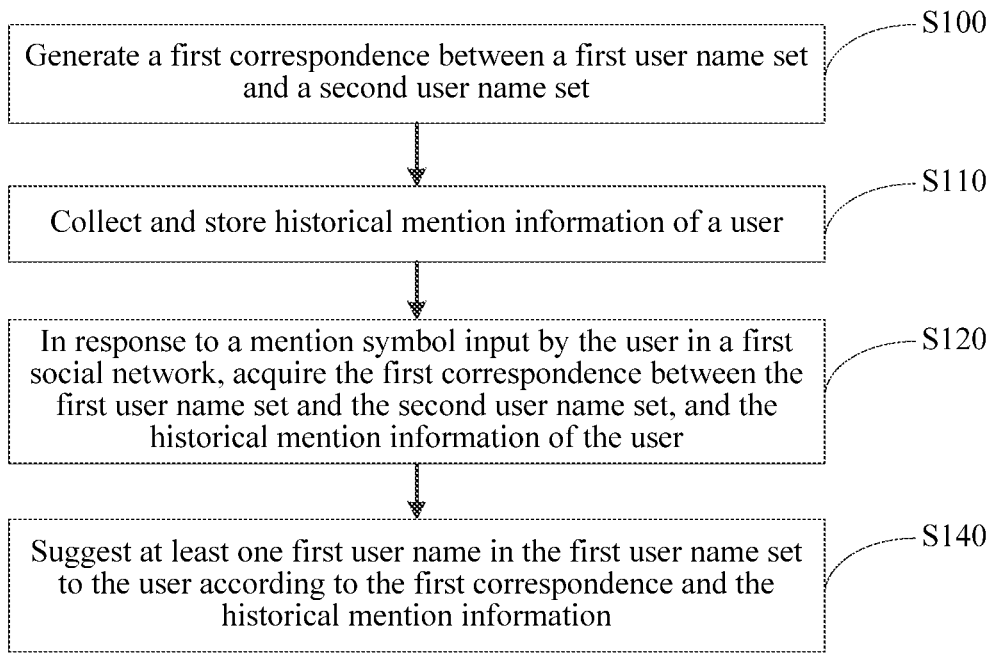
FIG. 2 is a flowchart of a mention suggestion method according to an example embodiment of the present application.

As shown in FIG. 2, in an example embodiment of the present application, the method further comprises:
S100: Generate the first correspondence between the first user name set and the second user name set.
In addition, the method may further comprise:
S110: Collect and store the historical mention information of the user.

The first correspondence may be generated by means of manual input by the user, for example, a configuration interface similar to Table 1 (where the user ID in the configuration interface is vacant) is provided for the user, and the first correspondence is generated after information input by the user is received; alternatively, the first correspondence can be generated automatically by learning a mention habit of the user or capturing registration information of the friends of the user.

The historical mention information of the user may be captured on a corresponding webpage by logging on to a corresponding social network after authorization of the user is acquired, and to improve the speed of executing the method, the information may be collected and stored in advance. According to different information types and different information sources, the historical mention information may have multiple situations, which will be described one by one below.

1) In an example embodiment, the historical mention information comprises: the number of times each first user name is mentioned in the first social network by the user and the number of times each second user name is mentioned in the other social network by the user.

Figure 3:
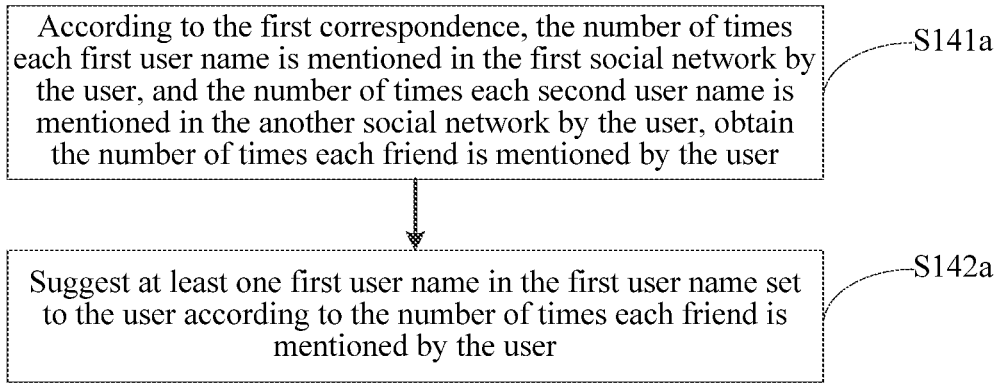
FIG. 3 is a flowchart of step S140 according to an example embodiment of the present application.

Correspondingly, referring to FIG. 3, step S140 comprises:
S141a: According to the first correspondence, the number of times each first user name is mentioned in the first social network by the user, and the number of times each second user name is mentioned in the other social network by the user, obtain the number of times each friend is mentioned by the user.
S142a: Suggest at least one of the first user names in the first user name set to the user according to the number of times each friend is mentioned by the user.

The number of times the user mentions a given user name in a given social network is the number of times the user posts content that corresponds to the given user name in the given social network, for example, when the user posts a piece of information "@ Zhangsan: Happy New Year's Day!" in Sina Weibo, the number of times the user name "Zhangsan" is mentioned in Sina Weibo by the user is increased by 1.

As shown in Table 2, it is still assumed that the first social network is Sina Weibo, and other social networks comprise Renren, WeChat, and QQ zone. The number of times each first user name is mentioned by the user in the first social network comprises that: A1 is mentioned once, B1 is mentioned 6 times, and C1 is mentioned 5 times, D1 is mentioned 3 times; the number of times each second user name is mentioned by the user in the other social network comprises that: A2 is mentioned 12 times, B2 is mentioned 4 times, D2 is mentioned twice, A3 is mentioned 8 times, B3 is mentioned 3 times, C3 is mentioned 5 times, D3 is mentioned once, A4 is mentioned 4 times, B4 is mentioned 3 times, C4 is mentioned 5 times, and D4 is mentioned once.

Correspondingly, it can be obtained that the user mentions the friend A 25 times, mentions the friend B 16 times, mentions the friend C 15 times, and mentions the friend D 7 times.

TABLE 2

| Friend/Number of times being mentioned | Sina Weibo user ID/Number of times being mentioned | Renren user ID/Number of times being mentioned | WeChat user ID/Number of times being mentioned | QQ zone user ID/Number of times being mentioned |
|---|---|---|---|---|
| A/25 | A1/1 | A2/12 | A3/8 | A4/4 |
| B/16 | B1/6 | B2/4 | B3/3 | B4/3 |
| C/20 | C1/10 | / | C3/5 | C4/5 |
| D/7 | D1/3 | D2/2 | D3/1 | D4/1 | i) Step S142a may comprise:
suggesting, to the user, the first user name that corresponds to at least one friend, of whom the number of times being mentioned is greater than a predetermined value. For example, in Table 2, the first user names A1 and B1 that correspond to the friend who is mentioned more than 15 times may be suggested to the user.

ii) Alternatively, step S142a may also comprise:

sorting the first user name corresponding to each friend according to the number of times each friend is mentioned by the user; and suggesting at least one of the sorted first user names to the user.

For example, in Table 2, according to the number of times each friend is mentioned by the user, the first user name corresponding to each friend is sorted as follows in descending order of the number of times being mentioned: A1, C1, B1, D1. Then, A1, C1, B1, and D1 may be suggested to the user sequentially; when there are a lot of first user names, only several top-ranked first user names are suggested, for example, only top 5 first user names are suggested.

Compared with conventional systems, this example embodiment comprehensively considers the number of times each first user name is mentioned in the first social network by the user and the number of times each second user name is mentioned in the other social network by the user, and can reflect a degree of intimacy between the user and the friends thereof more comprehensively, so that when the user needs to mention a user name, user names are suggested more accurately, which helps improve an input speed of the user.

2) In an example embodiment, the historical mention information comprises: the number of times each second user name is mentioned by the user in the other social network.

Figure 4:
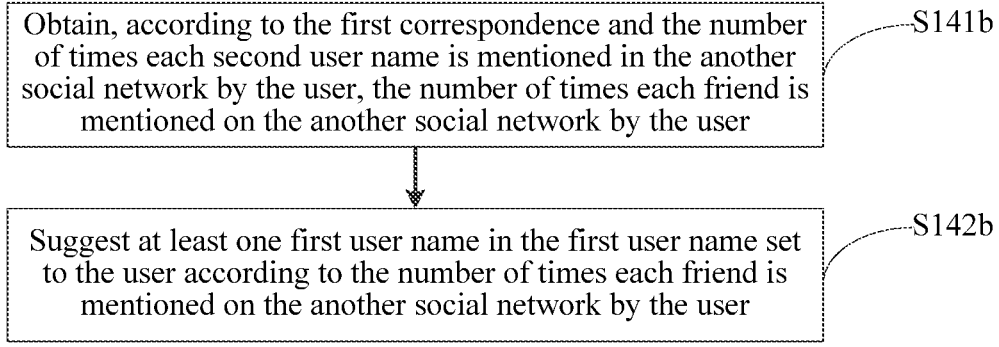
FIG. 4 is a flowchart of step S140 according to an example embodiment of the present application.

Correspondingly, referring to FIG. 4, step S140 comprises:

S141b: Obtain, according to the first correspondence and the number of times each second user name is mentioned in the other social network by the user, the number of times each friend is mentioned on the other social network by the user.

S142b: Suggest at least one of the first user names in the first user name set to the user according to the number of times each friend is mentioned on the other social network by the user.

As shown in Table 3, it is still assumed that the first social network is Sina Weibo, and other social networks comprise Renren, WeChat, and QQ zone. According to data in Table 3, it can be obtained that the user mentions the friend A on other social networks 24 times, mentions the friend B on other social networks 10 times, mentions the friend C on other social networks 10 times, and mentions the friend D on other social networks 4 times.

sponds to the friend who is mentioned more than 15 times may be suggested to the user.

ii) Alternatively, step S142b may also comprise:

sorting the first user name corresponding to each friend according to the number of times each friend is mentioned on the other social network by the user; and suggesting at least one of the sorted first user names to the user.

For example, in Table 3, according to the number of times each friend is mentioned on the other social network by the user, the first user name corresponding to each friend is sorted as follows in descending order of the number of times being mentioned: A1, B1, C1, D1. Then, A1, B1, C1, and D1 may be suggested to the user sequentially; when there are a lot of first user names, only several top-ranked first user names are suggested, for example, only top 5 first user names are suggested.

Compared with that of the foregoing example embodiment, the historical mention information in this example embodiment only considers the number of times each friend is mentioned on the other social network by the user, and does not consider the number of times each friend is mentioned on the current social network by the user, and mainly applies to situations in which the user has little historical mention information on the first social network, or the user registers on the first social network lately.

3) In an example embodiment, the historical mention information may comprise: a second correspondence between historical post content and historical mentioned user names of the user on the first social network and the other first social network.

Alternatively, the historical mention information may comprise: a second correspondence between historical post content and historical mentioned user names of the user on the other social network.

In the latter case, a correspondence between historical post content and historical mentioned user names of the user on the first social network is not considered, which mainly applies to situations in which the user has little historical mention information on the first social network, or the user registers on the first social network lately. Implementation principles of the foregoing two cases are similar in this example embodiment, and to be brief, only the former case is described in detail below.

The historical post content is information released by the user in history, excluding user names and mention symbols. As shown in Table 4, for example, if the user posted "How is the New Year's Day holiday arranged this year? @A1" previously, the historical mention information comprises: a

TABLE 3

| Friend/Number of times being mentioned | Sina Weibo user ID | Renren user ID/Number of times being mentioned | WeChat user ID/Number of times being mentioned | QQ zone user ID/Number of times being mentioned |
|---|---|---|---|---|
| A/24 | A1 | A2/12 | A3/8 | A4/4 |
| B/10 | B1 | B2/4 | B3/3 | B4/3 |
| C/10 | C1 | / | C3/5 | C4/5 |
| D/4 | D1 | D2/2 | D3/1 | D4/1 | i) Step S142b may comprise:

suggesting, to the user, the first user name that corresponds to at least one friend, of whom the number of times being mentioned is greater than a predetermined value. For example, the first user name A1 that corresecond correspondence between the historical post content "How is the New Year's Day holiday arranged this year?" and the historical mentioned user name "A1". The column of "keyword" in Table 4 may be extracted as required in subsequent steps (when a third correspondence is formed).

A person skilled in the art understands that, one piece of historical post content may correspond to multiple historical mentioned user names, and one historical mentioned user name may also correspond to multiple pieces of historical post content

TABLE 4

| Historical post content | Historical mentioned user name | Keyword |
|---|---|---|
| How is the New Year's Day holiday arranged this year? | A1 | New Year's Day, holiday |
| This patent is not bad. | B2 | Patent |
| Where are you having fun this weekend? | A3 | Weekend, fun |
| What's for supper? | C3 | Supper |
| Let's go climbing the Great Wall this week. | A1 | Climb the Great Wall |
| The scenery at the seaside of Qingdao is pretty good. | A4 | Seaside |
| Do you finish the application report? | B1 | Report |
| What time does the meeting start on Monday? | B2 | Meeting |
| Let's go to the library after work. | D3 | After work, library |
| Do you get home? | C4 | Get home |
| We are on the top of Mount Huang. | A2 | Top of the mountain |
| What a beautiful scene on the top of the mountain! | A1, C1 | Top of the mountain |

Figure 5:
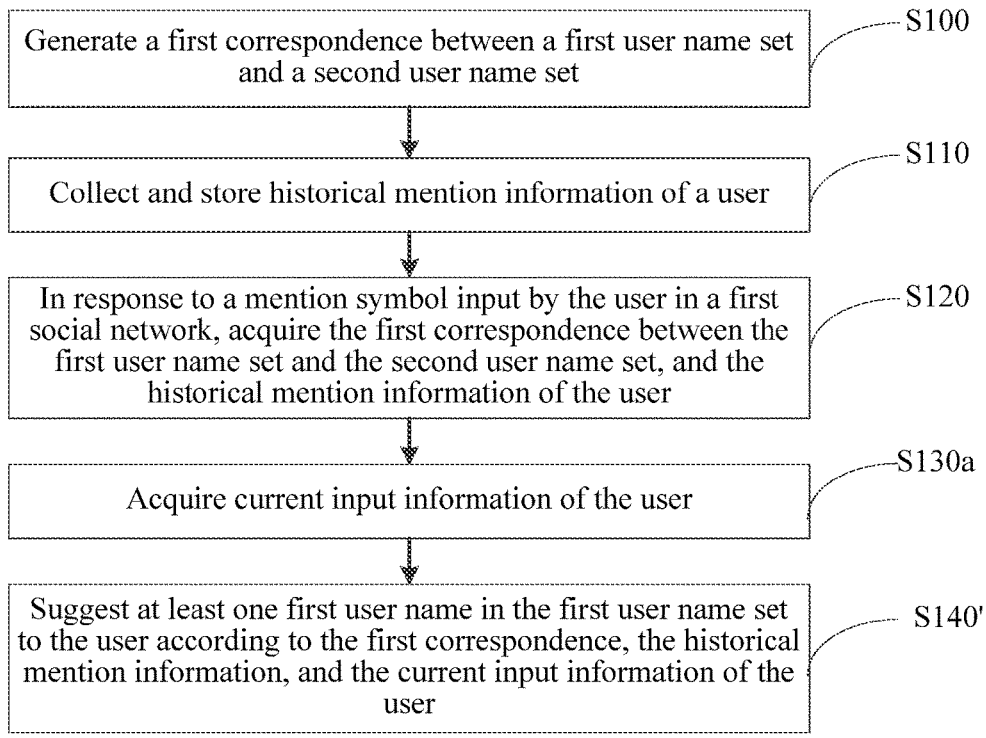
FIG. 5 is a flowchart of a mention suggestion method according to an example embodiment of the present application.

As shown in FIG. 5, when the corresponding first user name is suggested to the user by using the second correspondence, the method further comprises:

S130a: Acquire current input information of the user.

The current input information of the user may comprise: current post content.

Figure 6:
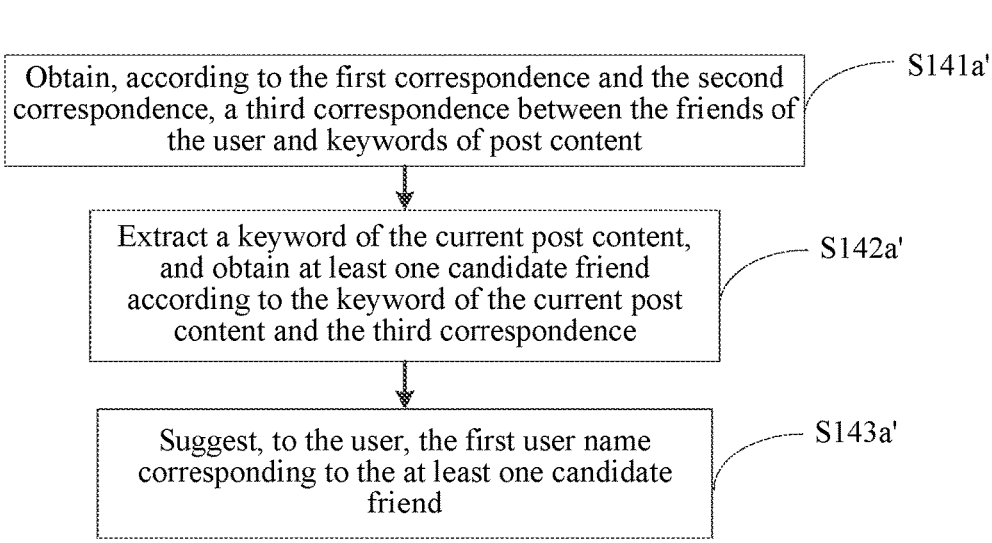
FIG. 6 is a flowchart of step S140' according to an example embodiment of the present application.

In this case, step S140 may comprise:

S140': Suggest at least one of the first user names in the first user name set to the user according to the first correspondence, the historical mention information, and the current input information of the user.

i) Correspondingly, in an optional embodiment, as shown in FIG. 6, step S140' may further comprise:

S141a': Obtain, according to the first correspondence and the second correspondence, a third correspondence between the friends of the user and keywords of post content.

S142a': Extract a keyword of the current post content, and obtain at least one candidate friend according to the keyword of the current post content and the third correspondence.

S143a': Suggest, to the user, the first user name corresponding to the at least one candidate friend.

The third correspondence reflects a correspondence between the friends of the user and keywords of the corresponding post content, for example, the third correspondenceshown in Table 5 (the first two columns) can be obtained according to Table 1 and Table 4. The third column can be obtained by analyzing the keywords in Table 5, that is, the friend A is related to outdoor activities, the friend B is related to work, the friend C is related to both family and outdoor activities, and the friend D is related to study.

TABLE 5

| Friend | Keyword | Keyword type/relevance |
|---|---|---|
| A | New Year's Day, holiday, weekend, fun, climb the Great Wall, seaside, top of the mountain | Outdoor/100% |

TABLE 5-continued

| Friend | Keyword | Keyword type/relevance |
|---|---|---|
| B | Patent, report, meeting | Work/100% |
| C | Supper, get home, top of the mountain | Family/67%, outdoor/33% |
| D | After work, library | Study/100% |

Assuming that the user has input information "Two hours, finally on the top of the mountain!@" on Sina Weibo, the keyword "top of the mountain" may be extracted from the current post content "finally on the top of the mountain!", and candidate friends A and C can be obtained by matching the keyword extracted from the current post content with the keywords in Table 5, thereby suggesting the first user names A1 and C1 to the user.

As shown in Table 5, in the third correspondence, statistics about occurrence frequency of different types of keywords may be collected to obtain relevance between each friend and each type of keywords. For example, in Table 5, the relevance between the friend A and outdoor-type keywords is 100%, the relevance between the friend C and family-type keywords is 67%, and the relevance between the friend C and the outdoor-type keywords is 33%. With reference to the keyword of the current post content of the user, it can be determined that the probability that the user mentions A1 currently is obviously greater than the probability of mentioning C1, and therefore, A1 is suggested preferentially.

ii) In an optional embodiment, the current input information of the user may further comprise: a prefix of the first user name. For example, if the user has input information "Two hours, finally on the top of the mountain!@ g" on Sina Weibo, the first user name set may also be filtered according to the prefix g of the first user name. In other words, the first user name set may be filtered twice according to the current post content of the user and the prefix of the first user name, so as to further improve the accuracy of suggestion.

Figure 7:
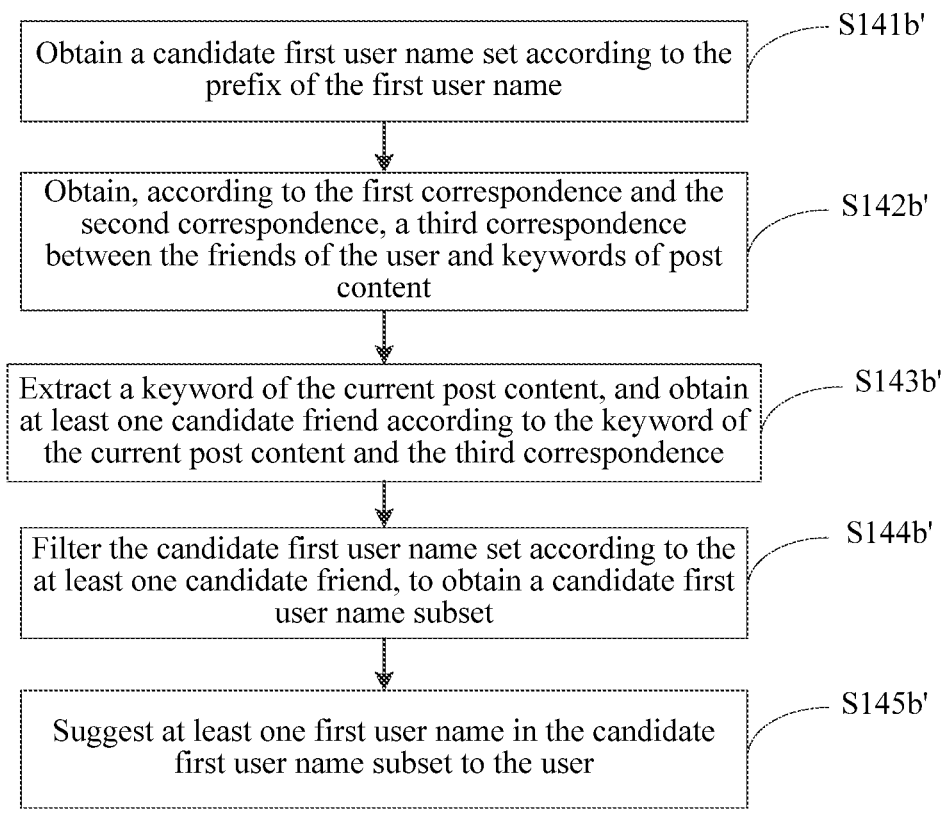
FIG. 7 is a flowchart of step S140' according to an example embodiment of the present application.

Specifically, as shown in FIG. 7, step S140' may further comprise:

S141b': Obtain a candidate first user name set according to the prefix of the first user name.

S142b': Obtain, according to the first correspondence and the second correspondence, a third correspondence between the friends of the user and keywords of post content.

S143b': Extract a keyword of the current post content, and obtain at least one candidate friend according to the keyword of the current post content and the third correspondence.

S144b': Filter the candidate first user name set according to the at least one candidate friend, to obtain a candidate first user name subset.

S145b': Suggest at least one first user name in the candidate first user name subset to the user.

iii) In another example embodiment, apart from the second correspondence, the historical mention information may further comprise: the number of times each first user name is mentioned in the first social network by the user and the number of times each second user name is mentioned in the other social network by the user.

Alternatively, apart from the second correspondence, the historical mention information may further comprise: the number of times each second user name is mentioned in the other social network by the user. Because the two cases are similar, to be brief, only the former case is described in detail below.

Figure 8:
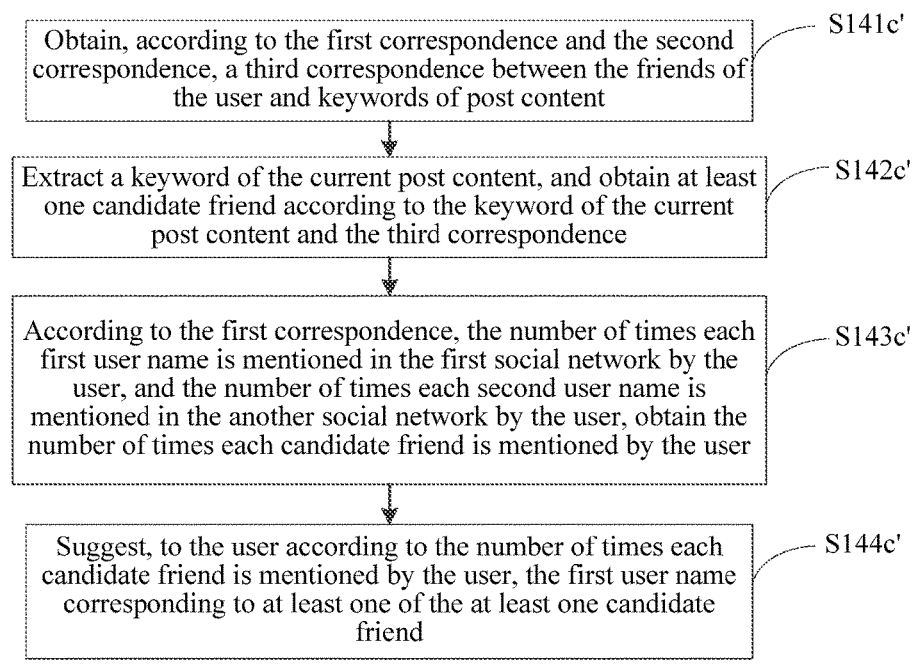
FIG. 8 is a flowchart of step S140' according to an example embodiment of the present application.

If the historical mention information further comprises: the number of times each first user name is mentioned in the first social network by the user, and the number of times each second user name is mentioned in the other social network by the user, as shown in FIG. 8, step S140' may further comprise:

S141c': Obtain, according to the first correspondence and the second correspondence, a third correspondence between the friends of the user and keywords of post content.

S142c': Extract a keyword of the current post content, and obtain at least one candidate friend according to the keyword of the current post content and the third correspondence.

S143c': According to the first correspondence, the number of times each first user name is mentioned in the first social network by the user, and the number of times each second user name is mentioned in the other social network by the user, obtain the number of times each candidate friend is mentioned by the user.

S144c': Suggest, to the user according to the number of times each candidate friend is mentioned by the user, the first user name corresponding to at least one of the at least one candidate friend.

For example, in step S142c', the candidate friends A and C are obtained according to Table 1, Table 4, and Table 5; it is obtained in step S143c' that the user mentions the friend A 6 times, and mentions the friend C 3 times, and according to descending order of the number of mentions, A1 and C1 are suggested to the user sequentially.

4) In an example embodiment of the present application, the historical mention information may comprise: a fourth correspondence between environment information of historical post content and historical mentioned user names of the user on the first social network and on the other first social network.

Alternatively, the historical mention information may comprise: a fourth correspondence between environment information of historical post content and historical mentioned user names of the user on the other social network.

In the latter case, a correspondence between environment information of historical post content and historical mentioned user names of the user on the first social network is not considered, which mainly applies to situations in which the user has little historical mention information on the first social network, or the user registers on the first social network lately. Implementation principles of the foregoing two cases are similar in this example embodiment, and to be brief, only the former case is described in detail below.

The environment information may comprise: at least one of physical status information of the user, psychological status information of the user, and surrounding environment status information of the user. The environment information of the historical post content is environment information when the user posts the historical post content. The physical status information comprises: heart rate, blood pressure, blood fat, brain wave, motion state of a certain part of the body, and the like, and this type of information generally can be detected by using a corresponding sensor. The psychological status information comprises: psychological emotion information, and the like, and this type of information can be obtained by collecting expressions of the user. The surrounding environment information comprises: time, location, brightness, temperature, humidity, and the like, and this type of information can also be obtained by using a corresponding sensor. As shown in Table 6, for example, if the user posted a piece of information on WeChat previously and mentioned C3 and D3, the historical mention information comprises environment information when the piece of information was posted: 10 AM on a workday, office; and the historical mention information further comprises the user names C3 and D3 mentioned when this piece of information was posted. The column of "attribute of environment information" in Table 6 may be extracted as required in subsequent steps (when the fifth correspondence is formed). A person skilled in the art understands that, one piece of environment information of historical post content may correspond to multiple historical mentioned user names, and one historical mentioned user name may also correspond to multiple pieces of environment information of historical post content.

TABLE 6

| Environment information of historical post content | Historical mentioned user name | Attribute of environment information |
|---|---|---|
| 10 AM on a workday, office | C3, D3 | Working time on workday, office |
| 3 PM on a workday, office | C1 | Working time on workday, office |
| 12 AM on a weekend, park | A1 | Holiday, outdoor |
| 9 PM on a workday, home | B1 | Off hours on workday, home |
| 5 PM on a workday, office | C4 | Working time on workday, office |
| Running, with a heart rate of 150 beats per minute | C3 | Strenuous exercise |
| Static, face flushed red, with a heart rate of 140 beats per minute | D3 | Excited |
| Corners of the mouth curving up, and eyes squinted | C4 | Happy |

Figure 9:
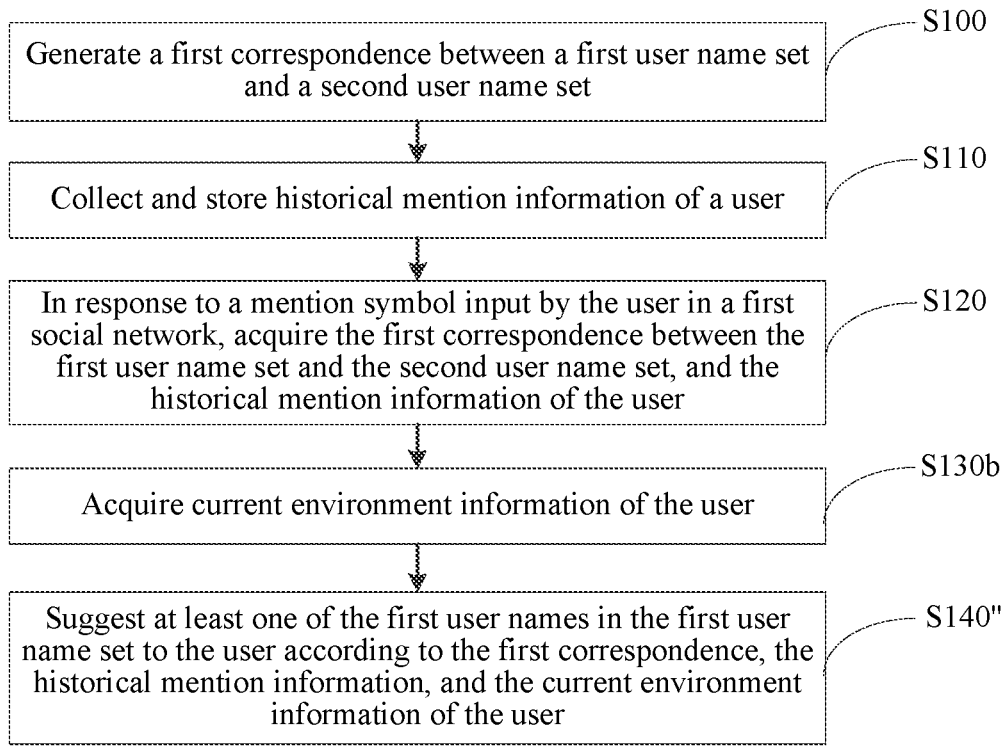
FIG. 9 is a flowchart of a mention suggestion method according to an example embodiment of the present application.

As shown in FIG. 9, when the corresponding first user name is suggested to the user by using the fourth correspondence, the method further comprises:

S130b: Acquire current environment information of the user.

Figure 10:
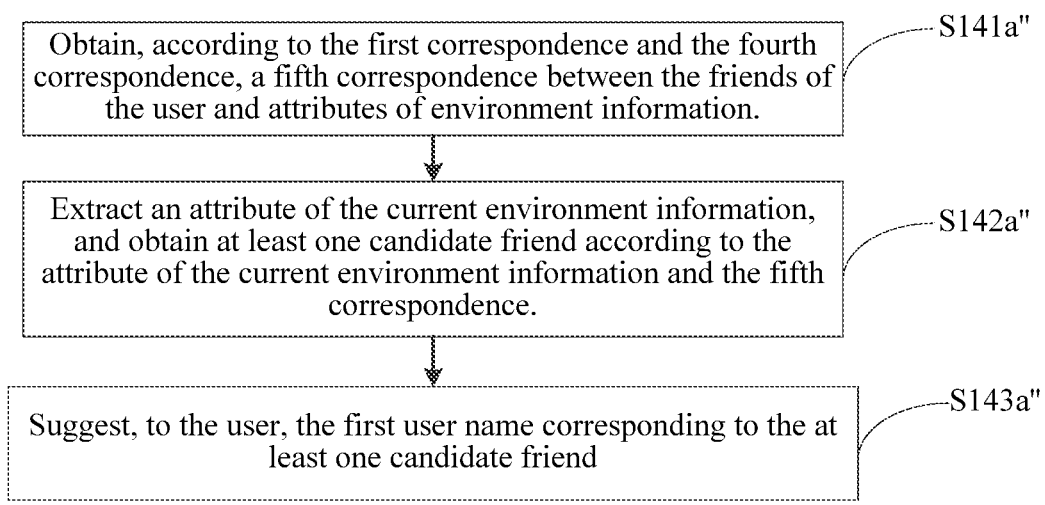
FIG. 10 is a flowchart of step S140" according to an example embodiment of the present application.

Correspondingly, step S140 comprises:

S140": Suggest at least one of the first user names in the first user name set to the user according to the first correspondence, the historical mention information, and the current environment information of the user.

i) Specifically, as shown in FIG. 10, in an optional example embodiment, Step S140" may further comprise:

S141a": Obtain, according to the first correspondence and the fourth correspondence, a fifth correspondence between the friends of the user and attributes of environment information.

S142a": Extract an attribute of the current environment information, and obtain at least one candidate friend according to the attribute of the current environment information and the fifth correspondence.

S143a": Suggest, to the user, the first user name corresponding to the at least one candidate friend.

The fifth correspondence reflects a correspondence between the friends of the user and attributes of the environment information, for example, the fifth correspondence shown in Table 7 can be obtained according to Table 1 and Table 6. It can be seen in Table 7 that, the attribute of the environment information corresponding to the friend A is (holiday, outdoor), the attribute of the environment information corresponding to the friend B is (off hours on workday, home), the attribute of the environment information corresponding to the friend C is (working time on workday, office, strenuous exercise, happy), and the attribute of the environment information corresponding to the friend D is (working time on workday, office, excited).

TABLE 7

| Friend | Attribute of environment information |
|---|---|
| A | Holiday, outdoor |
| B | Off hours on workday, home |
| C | Working time on workday, office, strenuous exercise, happy |
| D | Working time on workday, office, excited |

Assuming that the user currently is going to post a piece of information on Sina Weibo, the current environment information acquired by using a corresponding sensor comprises: time: 10 AM on Feb. 18, 2013; and location: office. The extracted attribute of the current environment information is (working time on workday, office), and further, according to the fifth correspondence, the candidate friends C and D can be obtained by means of matching. Therefore, the first user names C1 and D1 may be suggested to the user.

ii) In another example embodiment, apart from the fourth correspondence, the historical mention information may further comprise: the number of times each first user name is mentioned in the first social network by the user and the number of times each second user name is mentioned in the other social network by the user.

Alternatively, apart from the second correspondence, the historical mention information may further comprise: the number of times each second user name is mentioned in the other social network by the user. Because the two cases are similar, to be brief, only the former case is described in detail below.

Figure 11:
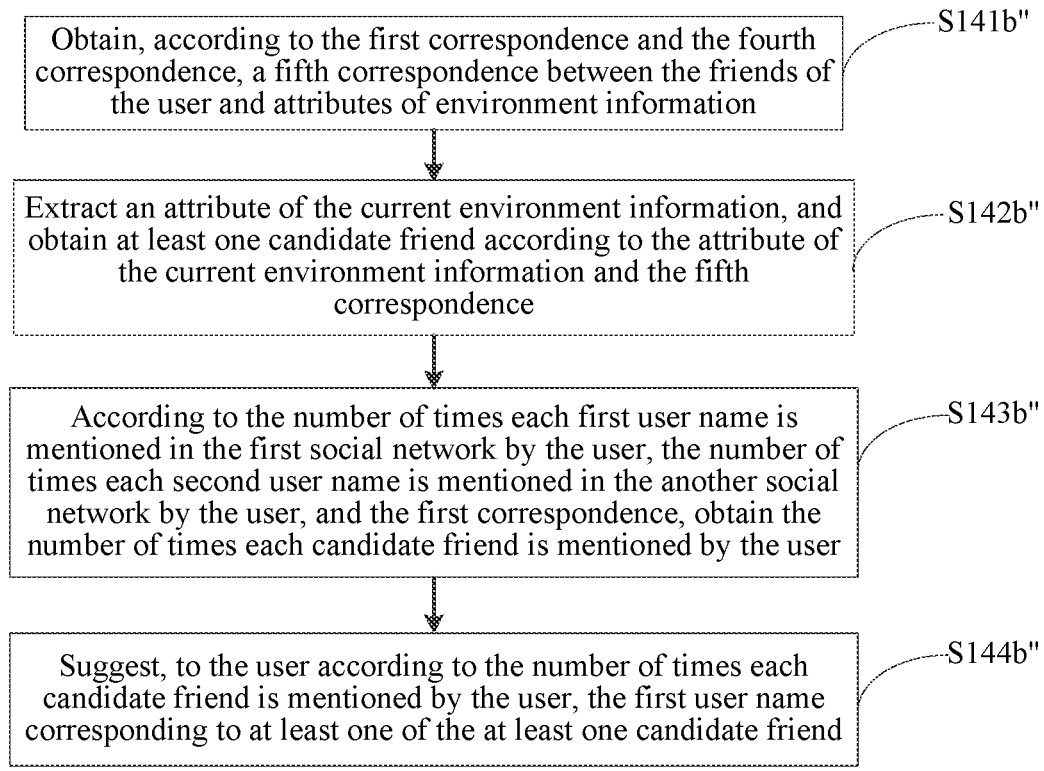
FIG. 11 is a flowchart of step S140" according to an example embodiment of the present application.

If the historical mention information further comprises: the number of times each first user name is mentioned in the first social network by the user, and the number of times each second user name is mentioned in the other social network by the user, as shown in FIG. 11, step S140"may further comprise:

S141b": Obtain, according to the first correspondence and the fourth correspondence, a fifth correspondence between the friends of the user and attributes of environment information.

S142b": Extract an attribute of the current environment information, and obtain at least one candidate friend according to the attribute of the current environment information and the fifth correspondence.

S143b": According to the number of times each first user name is mentioned in the first social network by the user, the number of times each second user name is mentioned in the other social network by the user, and the first correspondence, obtain the number of times each candidate friend is mentioned by the user.

S144b": Suggest, to the user according to the number of times each candidate friend is mentioned by the user, the first user name corresponding to at least one of the at least one candidate friend.

For example, in step S142b", the candidate friends C and D are obtained according to Table 1, Table 6, and Table 7; it is obtained in step S143b"that the user mentions the friend A three times, and mentions the friend C once, and according to descending order of the number of mentions, C1 and D1 are suggested to the user sequentially.

In addition, the embodiments of the present application also provide a computer readable storage medium, comprising at least one executable instruction, which perform the following operations when being executed: executing the operations of steps S120 and S140 of the method in the implementation shown in FIG. 1.

A person skilled in the art understands that, the method of this example embodiment may further suggest the corresponding first user name to the user according to the second correspondence between historical post content and historical mentioned user names of the user on the first social network and the other social network (or the second correspondence between historical post content and historical mentioned user names of the user on the other social network), so as to further improve the accuracy of suggestion.

Figure 12:
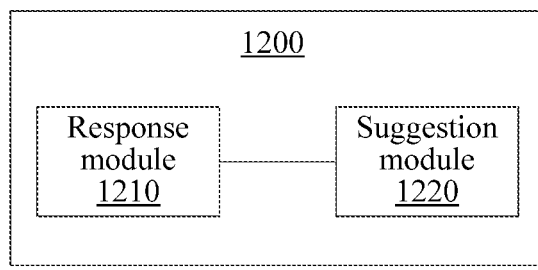
FIG. 12 is a schematic structural diagram of modules of a mention suggestion system according to an embodiment of the present application.

FIG. 12 is a schematic structural diagram of modules of a mention suggestion system according to an embodiment of the present application. The mention suggestion system 1200 may be applied to terminals such as a personal computer, a tablet computer, a smart phone, and a smart wearable device.

As shown in FIG. 12, the system 1200 comprises:
 a response module 1210, configured to: in response to a mention symbol input by a user in a first social network, acquire a first correspondence between a first user name set and a second user name set, and historical mention information of the user, where the first user name set comprises at least one first user name of a friend of the user in the first social network, and the second user name set comprises at least one second user name of the friend of the user in another social network; and
 a suggestion module 1220, configured to: suggest at least one of the first user names in the first user name set to the user according to the first correspondence and the historical mention information.

The response module 1210 may be configured to acquire the first correspondence between the first user name set and the second user name set, and the historical mention information of the user locally, or the response module 1210 may acquire the first correspondence between the first user name set and the second user name set, and the historical mention information of the user externally by using a network.

Figure 13:
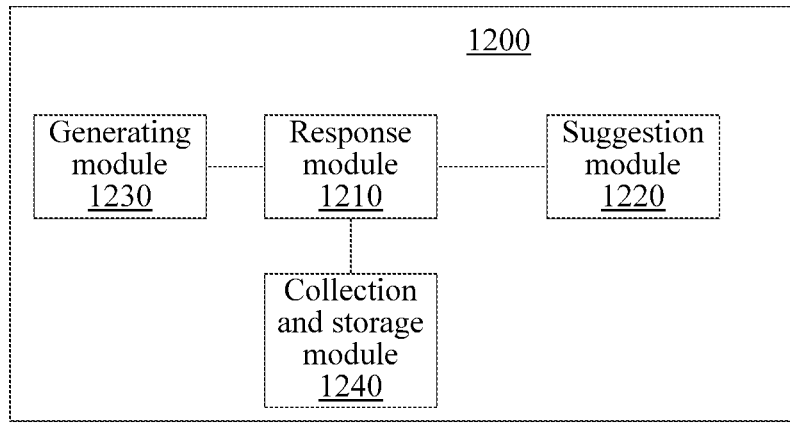
FIG. 13 is a schematic structural diagram of modules of a mention suggestion system according to an example embodiment of the present application.

As shown in FIG. 13, in an example embodiment of the present application, the system may further comprise:
 a generating module 1230, configured to generate the first correspondence between the first user name set and the second user name set; and
 a collection and storage module 1240, configured to collect and store the historical mention information of the user.

According to different information types and information sources of the historical mention information, the response module 1210 and the suggestion module 1220 may be implemented in different manners, which will be described one by one below.

Figure 14:
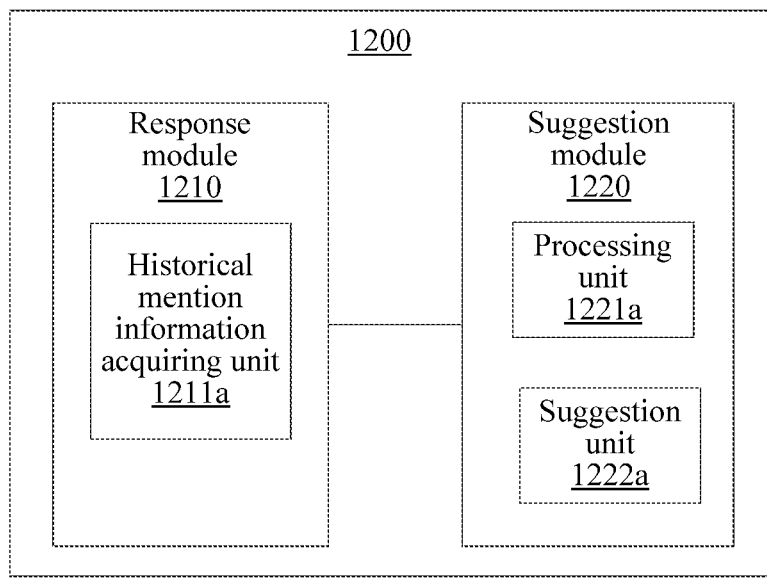
FIG. 14 is a schematic structural diagram of modules of a mention suggestion system according to an example embodiment of the present application.

1) As shown in FIG. 14, in an example embodiment of the present application, the response module 1210 may comprise:
 a historical mention information acquiring unit 1211a, configured to acquire the number of times each first user name is mentioned in the first social network by the user and the number of times each second user name is mentioned in the other social network by the user, and use the acquired number of times as the historical mention information.

The suggestion module 1220 may comprise:
- a processing unit 1221a, configured to: according to the first correspondence, the number of times each first user name is mentioned in the first social network by the user, and the number of times each second user name is mentioned in the other social network by the user, obtain the number of times each friend is mentioned by the user; and
- a suggestion unit 1222a, configured to suggest at least one of the first user names in the first user name set to the user according to the number of times each friend is mentioned by the user.

The suggestion unit is configured to suggest, to the user, the first user name that corresponds to at least one friend, of whom the number of times being mentioned is greater than a predetermined value.

Figure 15:
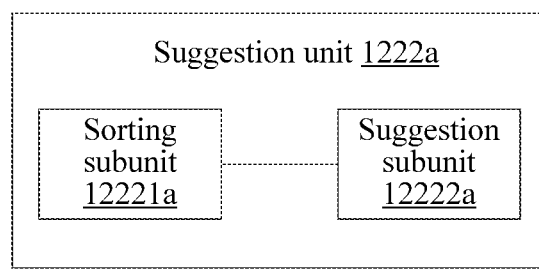
FIG. 15 is a schematic structural diagram of modules of a suggestion unit according to an example embodiment of the present application.

Alternatively, as shown in FIG. 15, the suggestion unit 1222a further comprises:
- a sorting subunit 12221a, configured to sort the first user name corresponding to each friend according to the number of times each friend is mentioned by the user; and
- a suggestion subunit 12222a, configured to suggest at least one of the sorted first user names to the user.

Figure 16:
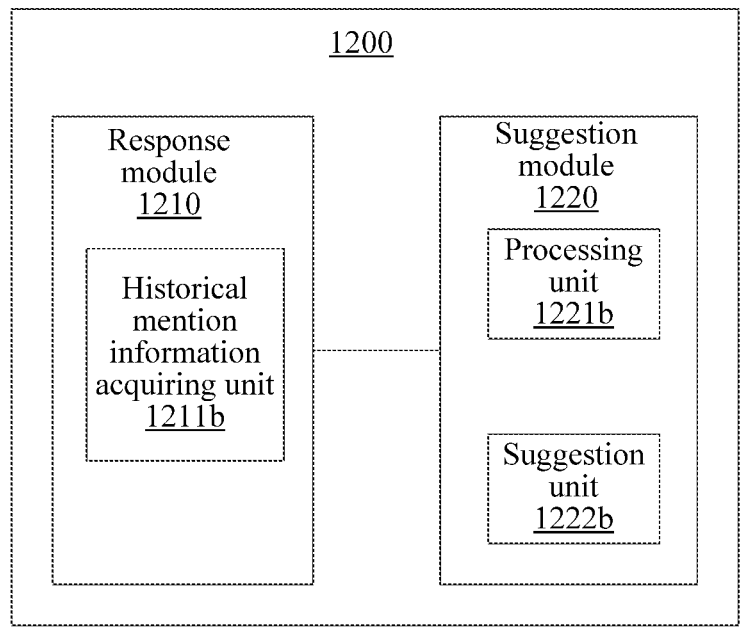
FIG. 16 is a schematic structural diagram of modules of a mention suggestion system according to an example embodiment of the present application.

2) As shown in FIG. 16, in an example embodiment of the present application, the response module 1210 may comprise:
- a historical mention information acquiring unit 1211b, configured acquire the number of times each second user name is mentioned in the other social network by the user, and use the acquired number of times as the historical mention information.

The suggestion module 1220 comprises:
- a processing unit 1221b, configured to obtain, according to the first correspondence and the number of times each second user name is mentioned in the other social network by the user, the number of times each friend is mentioned on the other social network by the user; and
- a suggestion unit 1222b, configured to suggest at least one of the first user names in the first user name set to the user according to the number of times each friend is mentioned on the other social network by the user.

The suggestion unit 1222b is configured to suggest, to the user, the first user name that corresponds to at least one friend, of whom the number of times being mentioned is greater than a predetermined value.

Figure 17:
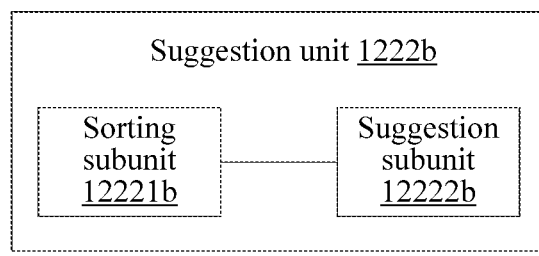
FIG. 17 is a schematic structural diagram of modules of a suggestion unit according to an example embodiment of the present application.

Alternatively, as shown in FIG. 17, the suggestion unit 1222b comprises:
- a sorting subunit 12221b, configured to sort the first user name corresponding to each friend according to the number of times each friend is mentioned on the other social network by the user; and
- a suggestion subunit 12222b, configured to suggest at least one of the sorted first user names to the user.

Figure 18:
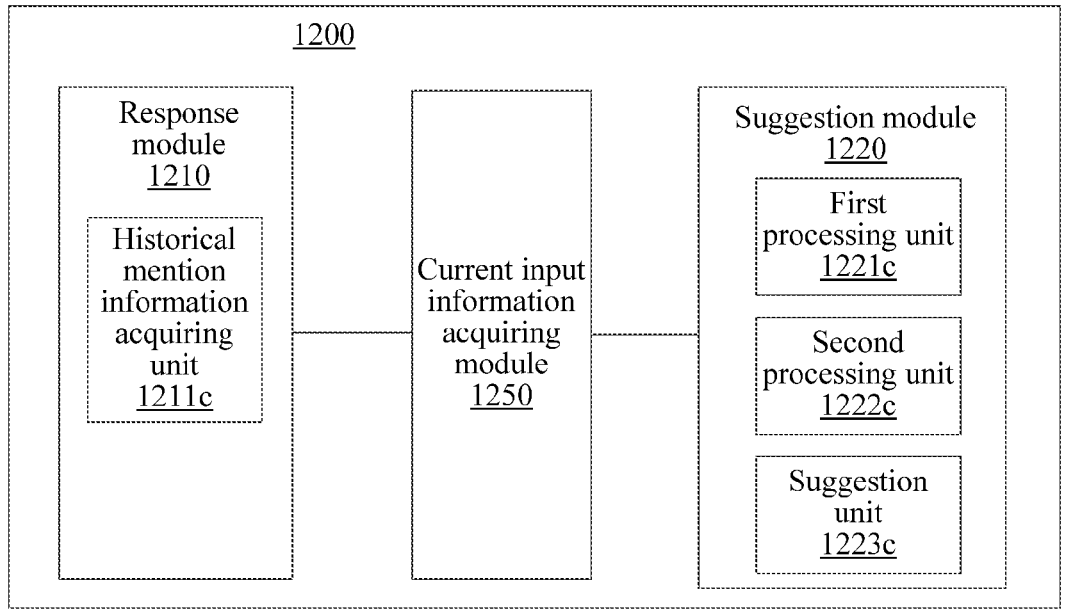
FIG. 18 is a schematic structural diagram of modules of a mention suggestion system according to an example embodiment of the present application.
Figure 19:
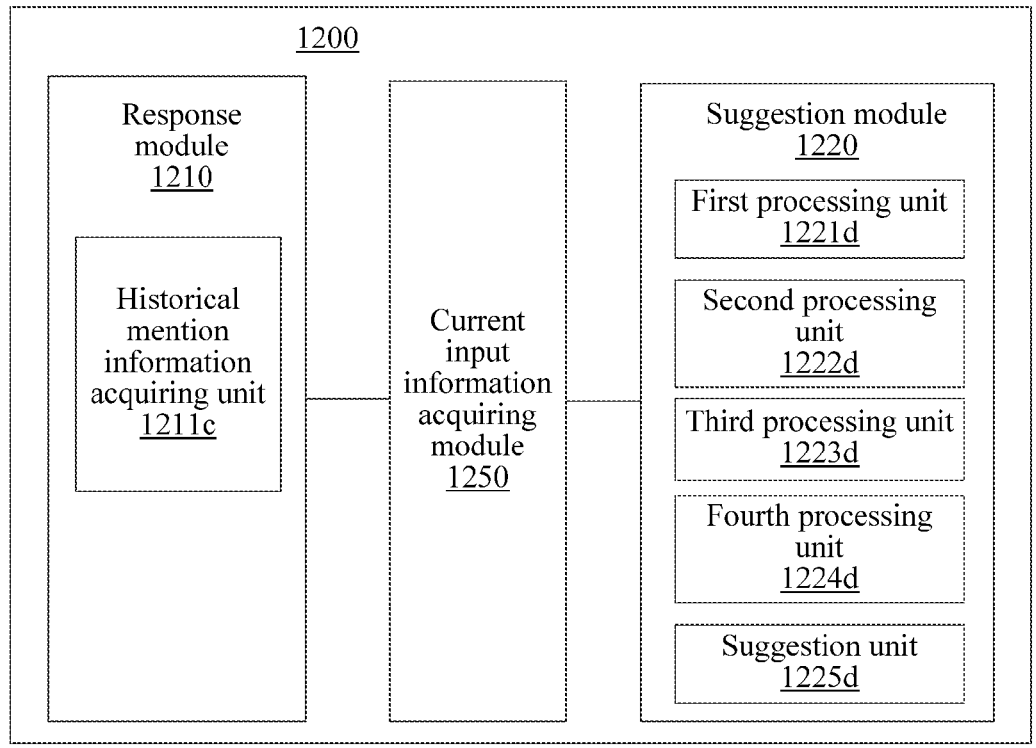
FIG. 19 is a schematic structural diagram of modules of a mention suggestion system according to an example embodiment of the present application.

3) As shown in FIG. 18 and FIG. 19, in an example embodiment of the present application, the response module 1210 may comprise:
- a historical mention information acquiring unit 1211c, configured to acquire a second correspondence between historical post content and historical mentioned user names of the user on the first social network and the other social network, and use the acquired second correspondence as the historical mention information.

A person skilled in the art understands that, the historical mention information acquiring unit 1211c may also be configured to acquire a second correspondence between historical post content and historical mentioned user names of the user on the other social network, and use the acquired second correspondence as the historical mention information; this case is similar to this example embodiment, and is not separately described again.

In this example embodiment, the system 1200 further comprises:
- a current input information acquiring module 1250, configured to acquire current input information of the user.

Moreover, the suggestion module 1220 is configured to suggest at least one of the first user names in the first user name set to the user according to the first correspondence, the historical mention information, and the current input information of the user.

i) Referring to FIG. 18, in an optional embodiment, the suggestion module 1220 may comprise:
- a first processing unit 1221c, configured to obtain, according to the first correspondence and the second correspondence, a third correspondence between the friends of the user and keywords of post content;
- a second processing unit 1222c, configured to extract a keyword of the current post content from the current post content of the user, and obtain at least one candidate friend according to the keyword of the current post content and the third correspondence; and
- a suggestion unit 1223c, configured to suggest, to the user, the first user name corresponding to the at least one candidate friend.

i) Alternatively, referring to FIG. 19, in another optional embodiment, the suggestion module 1220 may comprise:
- a first processing unit 1221d, configured to obtain, according to the first correspondence and the second correspondence, a third correspondence between the friends of the user and keywords of post content;
- a second processing unit 1222d, configured to extract a keyword of the current post content from the current post content of the user, and obtain at least one candidate friend according to the keyword of the current post content and the third correspondence;
- a third processing unit 1223d, configured to extract a prefix of the first user name from the current input information of the user, and obtain a candidate first user name set according to the prefix of the first user name;
- a fourth processing unit 1224d, configured to filter the candidate first user name set according to the at least one candidate friend, to obtain a candidate first user name subset; and
- a suggestion unit 1225d, configured to suggest at least one first user name in the candidate first user name subset to the user.

iii) Alternatively, in another optional embodiment, the historical mention information acquiring unit 1211c is further configured to acquire the number of times each first user name is mentioned in the first social network by the user and the number of times each second user name is mentioned in the other social network by the user, and use the acquired number of times as the historical mention information.

A person skilled in the art understands that, the historical mention information acquiring unit 1211c may also be configured to only acquire the number of times each second user name is mentioned in the other social network by the user, and use the acquired number of times as the historical mention information; this case is similar to this optional embodiment, and is not separately described again.

Figure 20:
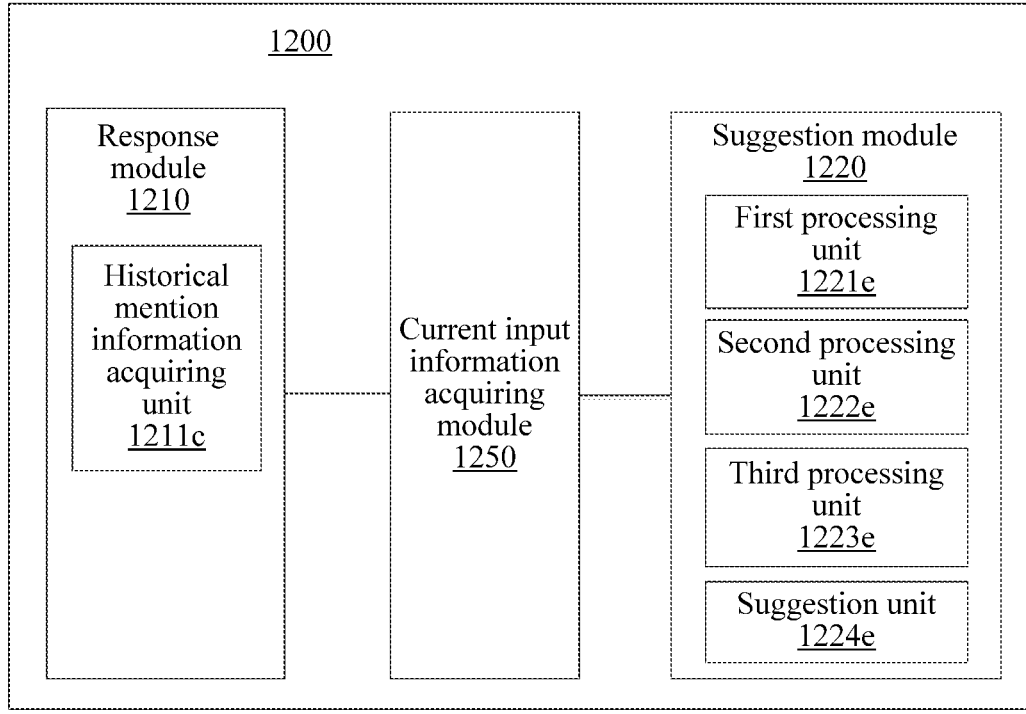
FIG. 20 is a schematic structural diagram of modules of a mention suggestion system according to an example embodiment of the present application.

Referring to FIG. 20, in this optional embodiment, the suggestion module comprises:
- a first processing unit 1221e, configured to obtain, according to the first correspondence and the second correspondence, a third correspondence between the friends of the user and keywords of post content;
- a second processing unit 1222e, configured to extract a keyword of the current post content from the current post content of the user, and obtain at least one candidate friend according to the keyword of the current post content and the third correspondence;
- a third processing unit 1223e, configured to: according to the first correspondence, the number of times each first user name is mentioned in the first social network by the user, and the number of times each second user name is mentioned in the other social network by the user, obtain the number of times each candidate friend is mentioned by the user; and
- a suggestion unit 1224e, configured to suggest, to the user according to the number of times each candidate friend is mentioned by the user, the first user name corresponding to at least one of the at least one candidate friend.

Figure 21:
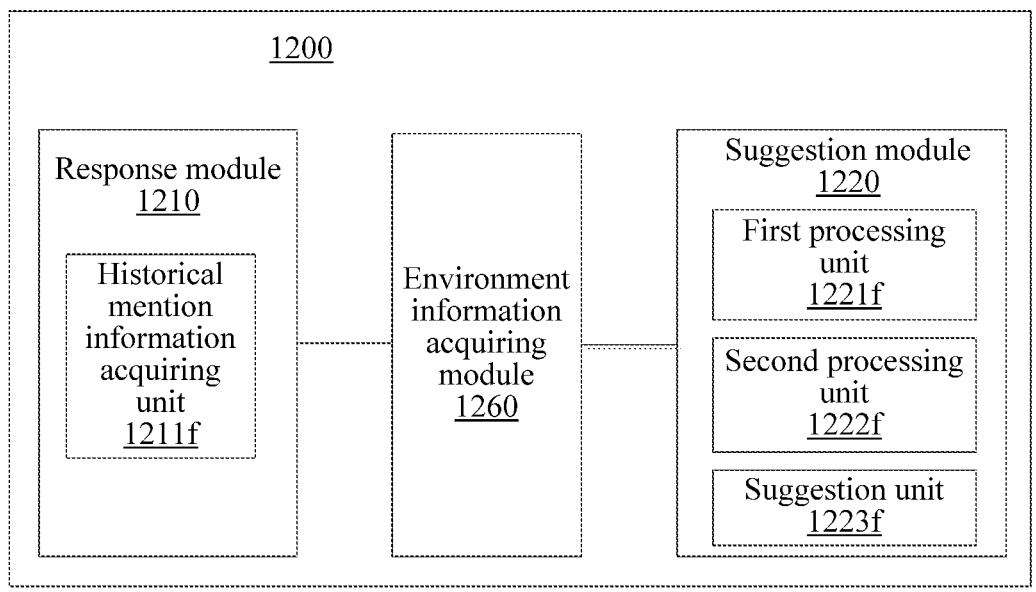
FIG. 21 is a schematic structural diagram of modules of a mention suggestion system according to an example embodiment of the present application.
Figure 22:
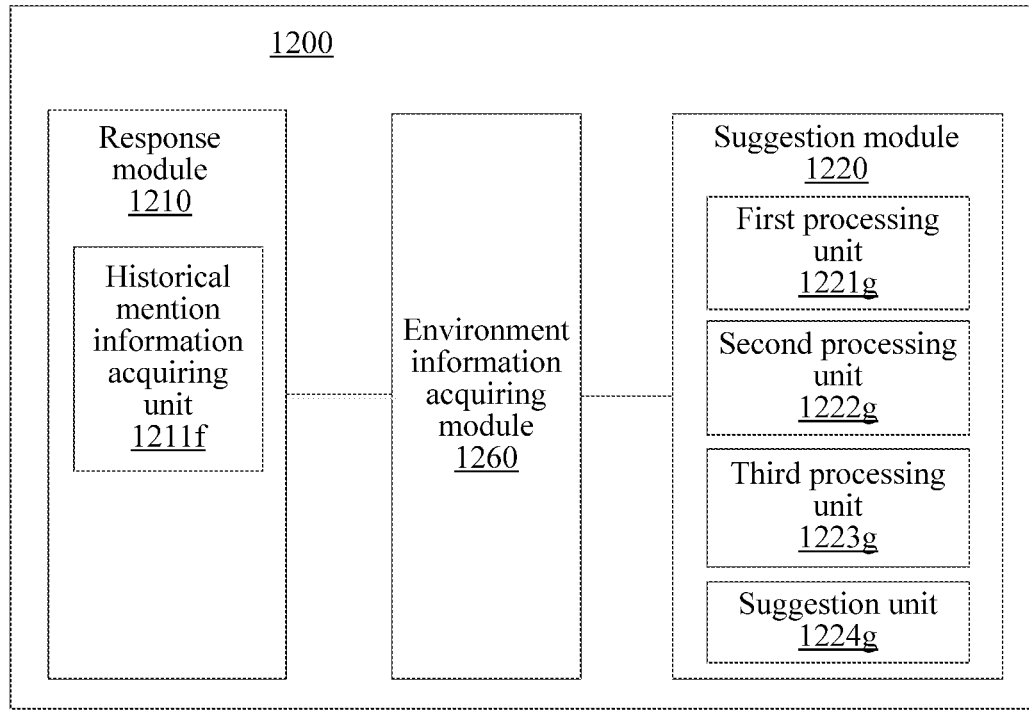
FIG. 22 is a schematic structural diagram of modules of a mention suggestion system according to an example embodiment of the present application.

3) As shown in FIG. 21 and FIG. 22, in an example embodiment of the present application, the response module 1210 comprises:
- a historical mention information acquiring unit 1211f, configured to acquire a fourth correspondence between environment information of historical post content and historical mentioned user names of the user on the first social network and the other social network, and use the acquired fourth correspondence as the historical mention information.

A person skilled in the art understands that, the historical mention information acquiring unit 1211f may also be configured to acquire a fourth correspondence between environment information of historical post content and historical mentioned user names of the user on the other social network, anduse the acquired fourth correspondence as the historical mention information; this case is similar to this example embodiment, and is not separately described again.

In this example embodiment, the system 1200 further comprises:
- an environment information acquiring module 1260, configured to acquire current environment information of the user.

Moreover, the suggestion module 1220 is configured to suggest at least one of the first user names in the first user name set to the user according to the first correspondence, the historical mention information, and the current environment information of the user.

i) Referring to FIG. 21, in an optional embodiment, the suggestion module 1220 comprises:
- a first processing unit 1221f, configured to obtain, according to the first correspondence and the fourth correspondence, a fifth correspondence between the friends of the user and attributes of environment information;
- a second processing unit 1222f, configured to extract an attribute of the current environment information, and obtain at least one candidate friend according to the attribute of the current environment information and the fifth correspondence; and
- a suggestion unit 1223f, configured to suggest, to the user, the first user name corresponding to the at least one candidate friend.

ii) Referring to FIG. 22, in another optional embodiment, the historical mention information acquiring unit 1211f is further configured to acquire the number of times each first user name is mentioned in the first social network by the user and the number of times each second user name is mentioned in the other social network by the user, and use the acquired number of times as the historical mention information.

A person skilled in the art understands that, the historical mention information acquiring unit 1211f may also be configured to only acquire the number of times each second user name is mentioned in the other social network by the user, and use the acquired number of times as the historical mention information; this case is similar to this optional embodiment, and is not separately described again.

In this optional embodiment, the suggestion module 1220 comprises:
- a first processing unit 1221g, configured to obtain, according to the first correspondence and the fourth correspondence, a fifth correspondence between the friends of the user and attributes of environment information;
- a second processing unit 1222g, configured to extract an attribute of the current environment information, and obtain at least one candidate friend according to the attribute of the current environment information and the fifth correspondence;
- a third processing unit 1223g, configured to: according to the number of times each first user name is mentioned in the first social network by the user, the number of times each second user name is mentioned in the other social network by the user, and the first correspondence, obtain the number of times each candidate friend is mentioned by the user;
- a suggestion unit 1224g, configured to suggest, to the user according to the number of times each candidate friend is mentioned by the user, the first user name corresponding to at least one of the at least one candidate friend.

A person skilled in the art understands that, after corresponding functional modules are added, the system of this example embodiment may further suggest the corresponding first user name to the user according to the second correspondence between historical post content and historical mentioned user names of the user on the first social network and the other social network (or the second correspondence between historical post content and historical mentioned user names of the user on the other social network), so as to further improve the accuracy of suggestion.

Figure 23:
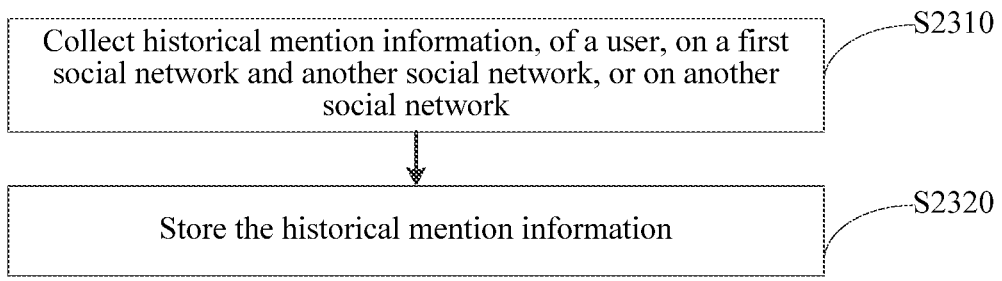
FIG. 23 is a flowchart of an information processing method according to an embodiment of the present application.

FIG. 23 is a flowchart of an information processing method according to an embodiment of the present application. As shown in FIG. 23, the method comprises:

S2310: Collect historical mention information, of a user, on a first social network and another social network, or on another social network.

S2320: Store the historical mention information.

1) Specifically, in an example embodiment, the historical mention information comprises: the number of times each first user name is mentioned in the first social network by the user and the number of times each second user name is mentioned in the other social network by the user, or the historical mention information comprises: the number of times each second user name is mentioned in the other social network by the user.

In another example embodiment, the historical mention information comprises: a second correspondence between historical post content and historical mentioned user names of the user on the first social network and the other first social network, or the historical mention information comprises: a second correspondence between historical post content and historical mentioned user names of the user on the other social network.

In another example embodiment, the historical mention information comprises: a fourth correspondence between environment information of historical post content and historical mentioned user names of the user on the first social network and the other first social network, or the historical mention information comprises: a fourth correspondence between environment information of historical post content and historical mentioned user names of the user on the other social network.

Figure 24:
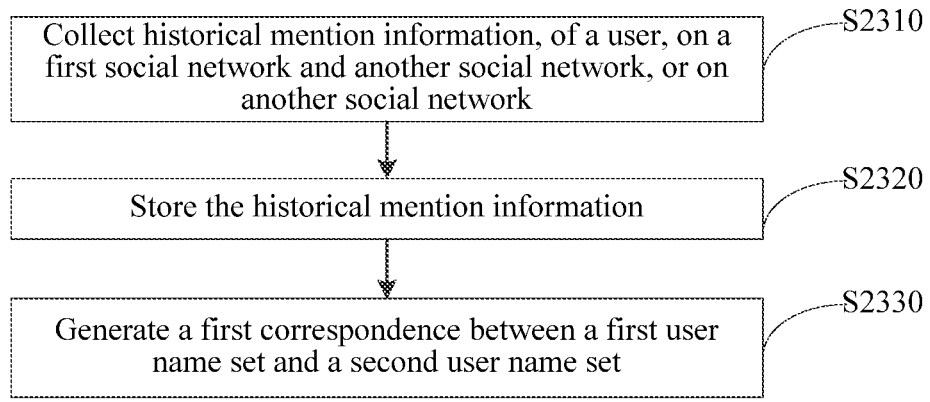
FIG. 24 is a flowchart of an information processing method according to an example embodiment of the present application.

Referring to FIG. 24, in an example embodiment of the present application, the method may further comprise:

S2330: Generate a first correspondence between a first user name set and a second user name set.

The first user name set comprises at least one first user name of a friend of the user in the first social network, and the second user name set comprises at least one second user name of the friend of the user in the other social network.

In addition, the embodiments of the present application also provide a computer readable storage medium, comprising at least one executable instruction, which perform the following operations when being executed: executing the operations of steps S2310 and S2320 of the method in the implementation shown in FIG. 23.

Figure 25:
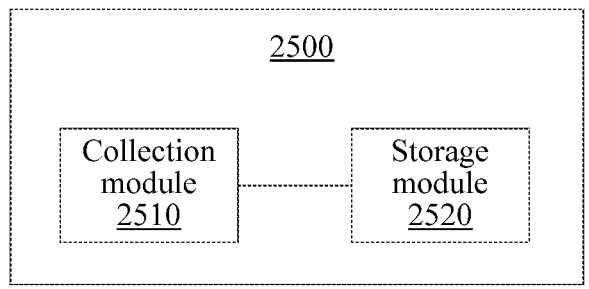
FIG. 25 is a schematic structural diagram of modules of an information processing system according to an embodiment of the present application.

FIG. 25 is a schematic structural diagram of modules of an information processing system according to an embodiment of the present invention. As shown in FIG. 25, the system 2500 comprises:

a collection module 2510, configured to collect historical mention information, of a user, on a first social network and another social network, or only on another social network; and a storage module 2520, configured to store the historical mention information.

The information processing system 2500 may be applied to terminals such as a personal computer, a tablet computer, and a smart phone, and may also be applied to intelligent wearable devices such as a smart wristband. It is assumed that the information processing system 2500 is applied to a smart wristband; in this case, when the user logs on to a social network on any electronic device, the electronic device can interact with the smart wristband to acquire the historical mention information, thereby accurately suggesting corresponding first user names to the user.

Figure 26:
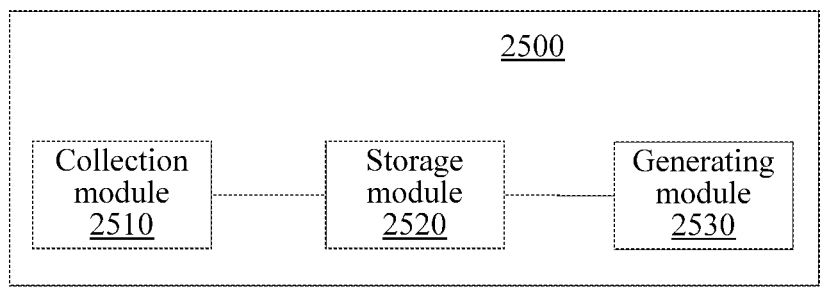
FIG. 26 is a schematic structural diagram of modules of an information processing system according to an example embodiment of the present application.

Referring to FIG. 26, in an example embodiment of the present application, the system 2500 may further comprise:

a generating module 2530, configured to generate a first correspondence between a first user name set and a second user name set, where the first user name set comprises at least one first user name of a friend of the user in the first social network, and the second user name set comprises at least one second user name of the friend of the user in the other social network.

Figure 27:
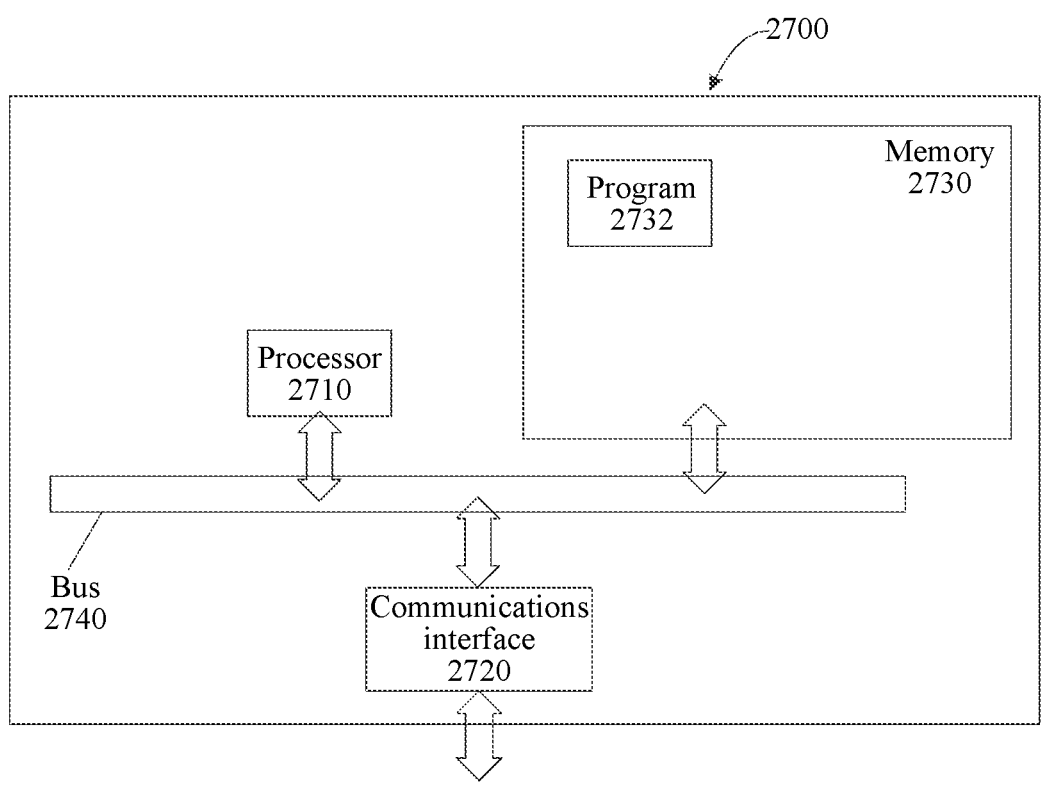
FIG. 27 is a structural diagram of a mention suggestion device according to an embodiment of the present application.

The structure of a mention suggestion device according to an embodiment of the present application is shown in FIG. 27. Specific embodiments of the present application do not limit the specific implementation of the mention suggestion device. Referring to FIG. 27, the mention suggestion device 2700 may comprise:

a processor 2710, a communications interface 2720, a memory 2730, and a communications bus 2740, where:
the processor 2710, the communications interface 2720, and the memory 2730 communicate with each other through the communications bus 2740.

The communications interface 2720 is configured to communicate with another network element.

The processor 2710 is configured to execute a program 2732, and may specifically execute related steps in the method embodiments shown in FIG. 1 to FIG. 12.

Specifically, the program 2732 may comprise program code, and the program code comprises a computer operation instruction.

The processor 2710 may be a central processing unit (CPU), or an Application Specific Integrated Circuit (ASIC), or may be configured as one or more integrated circuits for implementing the embodiments of the present application.

The memory 2730 is configured to store the program 2732. The memory 2730 may comprise a high-speed random access memory (RAM), and may also comprise a non-volatile memory, such as at least one disk memory. The program 2732 specifically may execute the following steps:

in response to a mention symbol input by a user in a first social network, acquiring a first correspondence between a first user name set and a second user name set, and historical mention information of the user, where the first user name set comprises at least one first user name of a friend of the user in the first social network, and the second user name set comprises at least one second user name of the friend of the user in another social network; and suggesting at least one first user name in the first user name set to the user according to the first correspondence and the historical mention information.

For specific implementation of each step in the program 2732, reference may be made to the corresponding step or module in the foregoing embodiments, and details are not described herein again. It is clear to a person skilled in the art that, to make the description easy and precise, for detailed working processes of the foregoing devices and modules, reference may be made to the corresponding process description in the foregoing method embodiments, and details are not described herein again.

Figure 28:
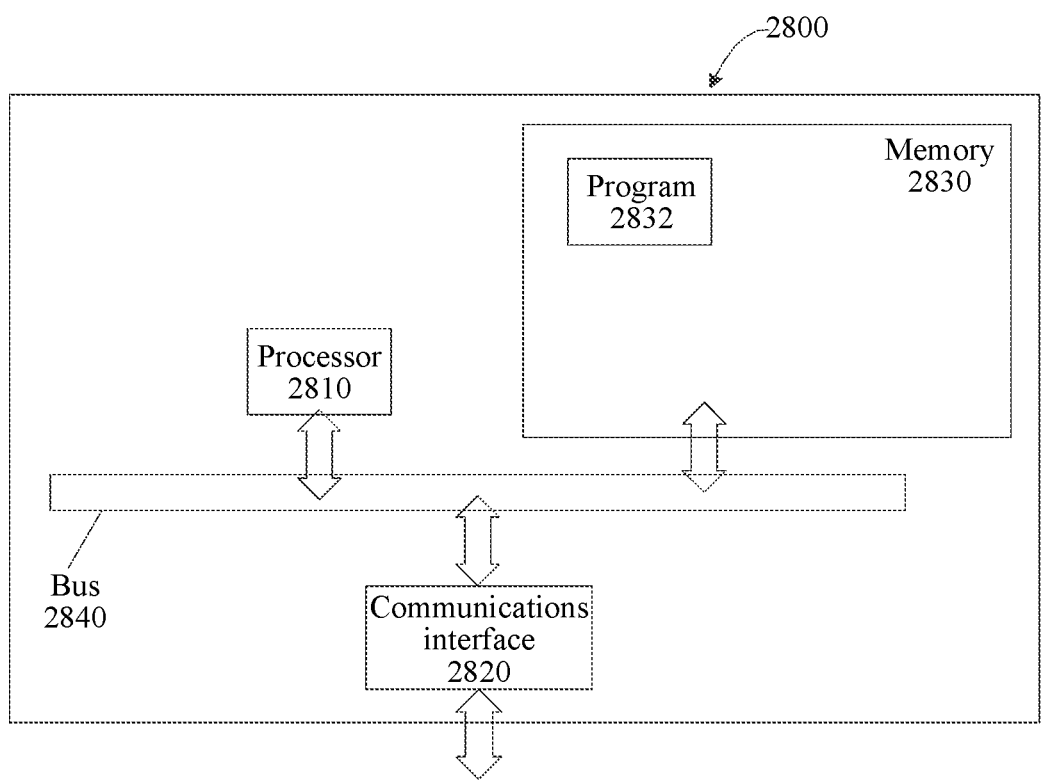
FIG. 28 is a structural diagram of an information processing device according to an embodiment of the present application.

The structure of an information processing device according to an embodiment of the present application is shown in FIG. 28. Specific embodiments of the present application do not limit the specific implementation of the information processing device. Referring to FIG. 28, the wearable device 2800 may comprise:

a processor 2810, a communications interface 2820, a memory 2830, and a communications bus 2840, where:
the processor 2810, the communications interface 2820, and the memory 2830 communicate with each other through the communications bus 2840.

The communications interface 2820 is configured to communicate with another network element.

The processor 2810 is configured to execute a program 2832, and may specifically execute related steps in the method embodiment shown in FIG. 9.

Specifically, the program 2832 may comprise program code, and the program code comprises a computer operation instruction.

The processor 2810 may be a CPU, or an ASIC, or may be configured as one or more integrated circuits for implementing the embodiments of the present application.

The memory 2830 is configured to store the program 2832. The memory 2830 may comprise a high-speed RAM, and may also comprise a non-volatile memory, such as at least one disk memory. The program 2832 specifically may execute the following steps:

collecting historical mention information, of a user, on a first social network and another social network, or on another social network; and storing the historical mention information.

For specific implementation of each step in the program 2832, reference may be made to the corresponding step or module in the foregoing embodiments, and details are not described herein again. It is clear to a person skilled in the art that, to make the description easy and precise, for detailed working processes of the foregoing devices and modules, reference may be made to the corresponding process description in the foregoing method embodiments, and details are not described herein again.

A person of ordinary skill in the art may realize that, the units and method steps of examples described with reference to the embodiments disclosed herein can be implemented by electronic hardware, or a combination of computer software and electronic hardware. Whether these functions are executed by hardware or software depends upon the particular application and design constraints of the technical solution. A person skilled in the art may use different methods to implement the described functions for each particular application, but such implementation should not be regarded as beyond the scope of the present application.

If implemented in the form of software functional units and sold or used as an independent product, the functions may be stored in a computer readable storage medium. Based on such an understanding, one or more parts of the various embodiments described herein can be implemented in the form of a software product. The computer software product may be stored in a storage medium and comprise several instructions for instructing a computer device (for example, a personal computer, a controller, or a network device) to execute all or a part of steps of the methods according to the embodiments of the present application. The foregoing storage medium comprises: any medium that can store program code, such as a USB flash disk, a removable hard disk, a read-only memory (ROM), a RAM, a magnetic disk, or an optical disc.

The foregoing example embodiments are merely used for describing the present application rather than limiting the present application. A person of ordinary skill in the art may make various modifications and variations without departing from the spirit and scope of the present application, and all the equivalent technical solutions also belong to the scope of the present application. The patent protection scope of the present application shall be subject to the claims.

What is claimed is:

1. A method, comprising:
   in response to a mention symbol input by a user in a first social network, acquiring, by a system comprising a processor, a first correspondence between a first user name set and a second user name set, and historical mention information of the user, wherein the first user name set comprises at least one first user name of a friend of the user in the first social network, and the second user name set comprises at least one second user name of the friend of the user in a second social network, wherein the historical mention information establishes a degree of intimacy between the user and the friend of the user, wherein the degree of intimacy is determined as a function of a first number of times that the user has mentioned the friend of the user on the first social network and the second social network and a second number of times the friend of the user has mentioned the user on the first social network and the second social network, and wherein the first correspondence refers to the mention symbol and a user name following the mention symbol; and
   suggesting, by the system, at least one first user name in the first user name set to the user according to the first correspondence and the historical mention information.

2. The method of claim 1, wherein the acquiring the first correspondence and the historical mention information comprises:
   acquiring, from a local memory, the first correspondence and the historical mention information.

3. The method of claim 1, wherein the acquiring the first correspondence and the historical mention information comprises:
   acquiring, externally by using a network device of a network, the first correspondence and the historical mention information.

4. The method of claim 1, further comprising:
   generating, by the system, the first correspondence.

5. The method of claim 1, further comprising:
   collecting and storing the historical mention information of the user.

6. The method of claim 1, wherein the historical mention information comprises:
   a third number of times each first user name is mentioned in the first social network by the user, and a fourth number of times each second user name is mentioned in the second social network by the user.

7. The method of claim 6, wherein the suggesting comprises:
   according to the first correspondence, the third number of times each first user name is mentioned in the first social network by the user, and the fourth number of times each second user name is mentioned in the second social network by the user, obtaining a respective number of times each friend of friends of the user is mentioned by the user; and
   suggesting the at least one first user name in the first user name set to the user according to the respective number of times each friend of the friends is mentioned by the user.

8. The method of claim 7, wherein the suggesting the at least one first user name comprises:
   suggesting the at least one first user name corresponding to at least one of the friends, for whom the respective number of times being mentioned is greater than a predetermined value.

9. The method of claim 7, wherein the suggesting the at least one first user name comprises:
   sorting, according to the respective number of times each friend of the friends is mentioned by the user, respective first user names corresponding to each user, resulting in sorted first user names; and
   suggesting at least one of the sorted first user names.

10. The method of claim 1, wherein the historical mention information comprises:
    a third number of times each second user name is mentioned in the second social network by the user.

11. The method of claim 10, wherein the suggesting comprises:
    obtaining, according to the first correspondence and the third number of times each second user name is mentioned in the second social network by the user, a respective number of times each friend of friends of the user is mentioned on the second social network by the user; and suggesting the at least one first user name in the first user name set to the user according to the respective number of times each friend of the friends is mentioned on the second social network by the user.

12. The method of claim 11, wherein the suggesting the at least one first user name comprises:
suggesting, to the user, the at least one first user name that corresponds to at least one of the friends, for whom the respective number of times being mentioned is greater than a predetermined value.

13. The method of claim 11, wherein the suggesting the at least one first user name comprises:
sorting, according to the respective number of times each friend of the friends is mentioned on the second social network by the user, respective first user names corresponding to each user resulting in sorted first user names; and
suggesting at least one of the sorted first user names to the user.

14. The method of claim 1, wherein the historical mention information comprises:
a second correspondence between historical post content and historical mentioned user names of the user on the first social network and the second social network.

15. The method of claim 1, wherein the historical mention information comprises:
a second correspondence between historical post content and historical mentioned user names of the user on the second social network.

16. The method of claim 14, further comprising:
acquiring, by the system, current input information of the user.

17. The method of claim 16, wherein the suggesting comprises:
suggesting the at least one first user name in the first user name set to the user according to the first correspondence, the historical mention information, and the current input information of the user.

18. The method of claim 16, wherein the current input information of the user comprises:
current post content.

19. The method of claim 18, wherein the suggesting comprises:
obtaining, according to the first correspondence and the second correspondence, a third correspondence between friends of the user and keywords of post content;
extracting a keyword of the current post content, and obtaining at least one candidate friend according to the keyword of the current post content and the third correspondence; and
suggesting the at least one first user name corresponding to the at least one candidate friend.

20. The method of claim 18, wherein the current input information of the user further comprises:
a prefix of a first user name of the at least one first user name.

21. The method of claim 20, wherein the suggesting the at least one first user name comprises:
obtaining a candidate first user name set according to the prefix of the first user name;
obtaining, according to the first correspondence and the second correspondence, a third correspondence between friends of the user and keywords of post content;
extracting a keyword of the current post content, and obtaining at least one candidate friend according to the keyword of the current post content and the third correspondence;
filtering the candidate first user name set according to the at least one candidate friend, to obtain a candidate first user name subset; and
suggesting the at least one first user name in the candidate first user name subset to the user.

22. The method of claim 18, wherein the historical mention information further comprises:
a third number of times each first user name is mentioned in the first social network by the user, and a fourth number of times each second user name is mentioned in the second social network by the user.

23. The method of claim 22, wherein the suggesting the at least one first user name comprises:
obtaining, according to the first correspondence and the second correspondence, a third correspondence between friends of the user and keywords of post content;
extracting a keyword of the current post content, and obtaining at least one candidate friend according to the keyword of the current post content and the third correspondence;
according to the first correspondence, the third number of times each first user name is mentioned in the first social network by the user, and the fourth number of times each second user name is mentioned in the second social network by the user, obtaining a respective number of times each candidate friend is mentioned by the user; and
suggesting, to the user according to the respective number of times each candidate friend is mentioned by the user, the at least one first user name corresponding to the at least one candidate friend.

24. The method of claim 1, wherein the historical mention information comprises:
a second correspondence between historical environment information of historical post content and historical mentioned user names of the user on the first social network and the second social network.

25. The method of claim 1, wherein the historical mention information comprises:
a second correspondence between historical environment information of historical post content and historical mentioned user names of the user on the second social network.

26. The method of claim 24, further comprising:
acquiring, by a system comprising a processor, current environment information of the user.

27. The method of claim 26, wherein the suggesting the at least one first user name comprises:
suggesting the at least one first user name in the first user name set to the user according to the first correspondence, the historical mention information, and the current environment information of the user.

28. The method of claim 27, wherein the suggesting the at least one first user name comprises:
obtaining, according to the first correspondence and the second correspondence, a third correspondence between friends of the user and attributes of environment information;
extracting an attribute of the current environment information, and obtaining at least one candidate friend according to the attribute of the current environment information and the third correspondence; and suggesting, to the user, the at least one first user name corresponding to the at least one candidate friend.

29. The method of claim 27, wherein the historical mention information further comprises:
   a third number of times each first user name is mentioned in the first social network by the user, and a fourth number of times each second user name is mentioned in the second social network by the user.

30. The method of claim 29, wherein the suggesting the at least one first user name comprises:
   obtaining, according to the first correspondence and the second correspondence, a third correspondence between friends of the user and attributes of environment information;
   extracting an attribute of the current environment information, and obtaining at least one candidate friend according to the attribute of the current environment information and the third correspondence;
   according to the third number of times the first user name is mentioned in the first social network by the user, the fourth number of times the second user name is mentioned in the second social network by the user, and the first correspondence, obtaining a respective number of times each candidate friend of the friends is mentioned by the user; and
   suggesting, according to the respective number of times each candidate friend is mentioned by the user, the at least one first user name corresponding to at least one of the at least one candidate friend.

31. The method of claim 24, wherein the historical environment information comprises at least one of physical status information of the user, psychological status information of the user, and surrounding environment status information of the user.

32. A system, comprising:
   a processor, coupled to a memory, that executes or facilitates execution of executable modules, comprising:
   a response module configured to:
   in response to a mention symbol input by a user in a first social network, acquire a first correspondence between a first user name set and a second user name set comprising second user names, and historical mention information of the user, wherein the first user name set comprises first user names comprising at least one first user name of a friend of the user in the first social network, and the second user name set comprises at least one second user name of the friend of the user in a second social network, wherein the historical mention information establishes a degree of intimacy between the user and the friend of the user, wherein the degree of intimacy is determined based on a first number of mentions, by the user, of the friend of the user on the first social network and the second social network and a second number of mentions, by the friend of the user, of the user on the first social network and the second social network, and wherein the first correspondence refers to the mention symbol and a user name following the mention symbol; and
   a suggestion module configured to: suggest at least one of the first user names in the first user name set to the user according to the first correspondence and the historical mention information.

33. The system of claim 32, wherein the response module is configured to acquire locally the first correspondence between the first user name set and the second user name set, and the historical mention information of the user.

34. The system of claim 32, wherein the response module is configured to acquire, externally by using a network, the first correspondence between the first user name set and the second user name set, and the historical mention information of the user.

35. The system of claim 32, wherein the executable modules further comprise:
   a generating module configured to generate the first correspondence between the first user name set and the second user name set.

36. The system of claim 32, wherein the executable modules further comprise:
   a collection and storage module configured to collect and store the historical mention information of the user.

37. The system of claim 32, wherein the response module comprises:
   a historical mention information acquiring unit configured to acquire a respective first number of times each first user name is mentioned in the first social network by the user and a respective second number of times each second user name is mentioned in the second social network by the user, and use the respective first number of times, and use the respective second number of times as the historical mention information.

38. The system of claim 37, wherein the suggestion module comprises:
   a processing unit configured to:
   according to the first correspondence, acquire the respective first number of times each first user name is mentioned in the first social network by the user, and the respective second number of times each second user name is mentioned in the second social network by the user, and obtain a respective number of times each friend is mentioned by the user; and
   a suggestion unit configured to suggest at least one of the first user names in the first user name set to the user according to the respective number of times each friend of friends of the user is mentioned by the user.

39. The system of claim 38, wherein the suggestion unit is configured to suggest, to the user, a first user name of the first user names corresponding to at least one of the friends, for whom the respective number of times being mentioned is greater than a predetermined value.

40. The system of claim 38, wherein the suggestion unit comprises:
   a sorting subunit configured to sort, according to the respective number of times each friend is mentioned by the user, the first user name corresponding to each user resulting in sorted first user names; and
   a suggestion subunit configured to suggest at least one of the sorted first user names to the user.

41. The system of claim 32, wherein the response module comprises:
   a historical mention information acquiring unit configured to acquire a third number of times each second user name is mentioned in the second social network by the user, and use the third number of times as the historical mention information.

42. The system of claim 41, wherein the suggestion module comprises:
   a processing unit configured to obtain, according to the first correspondence and the third number of times each second user name is mentioned in the second social network by the user, respective numbers of times each friend of friends of the user is mentioned on the second social network by the user; and a suggestion unit configured to suggest the at least one of the first user names in the first user name set to the user according to the respective numbers of times each friend is mentioned on the second social network by the user.

43. The system of claim 42, wherein the suggestion unit is configured to suggest, to the user, a first user name of the first user names corresponding to at least one of the friends, for whom the respective numbers of times being mentioned is greater than a predetermined value.

44. The system of claim 42, wherein the suggestion unit comprises:
a sorting subunit configured to sort, according to the respective numbers of times each friend is mentioned on the second social network by the user, a first user name of the first user names corresponding to each user resulting in sorted first user names; and
a suggestion subunit configured to suggest at least one of the sorted first user names to the user.

45. The system of claim 32, wherein the response module comprises:
a historical mention information acquiring unit configured to acquire a second correspondence between historical post content and historical mentioned user names of the user on the first social network and the second social network, and use the second correspondence as the historical mention information.

46. The system of claim 32, wherein the response module comprises:
a historical mention information acquiring unit configured to acquire a second correspondence between historical post content and historical mentioned user names of the user on the second social network, and use the second correspondence as the historical mention information.

47. The system of claim 45, wherein the executable modules further comprise:
a current input information acquiring module configured to acquire current input information of the user.

48. The system of claim 47, wherein the suggestion module is configured to suggest the at least one of the first user names in the first user name set to the user according to the first correspondence, the historical mention information, and the current input information of the user.

49. The system of claim 48, wherein the suggestion module comprises:
a first processing unit configured to obtain, according to the first correspondence and the second correspondence, a third correspondence between friends of the user and keywords of post content;
a second processing unit configured to extract a keyword of current post content from the current input information of the user, and obtain at least one candidate friend according to the keyword of the current post content and the third correspondence; and
a suggestion unit configured to suggest, to the user, the at least one of the first user names corresponding to the at least one candidate friend.

50. The system of claim 48, wherein the suggestion module comprises:
a first processing unit configured to obtain, according to the first correspondence and the second correspondence, a third correspondence between friends of the user and keywords of post content;
a second processing unit configured to extract a keyword of current post content from the current input information of the user, and obtain at least one candidate friend according to the keyword of the current post content and the third correspondence;
a third processing unit configured to extract a prefix of a first user name of the first user names from the current input information of the user, and obtain a candidate first user name set according to the prefix of the first user name;
a fourth processing unit configured to filter the candidate first user name set according to the at least one candidate friend, to obtain a candidate first user name subset; and
a suggestion unit configured to suggest the at least one of the first user names in the candidate first user name subset to the user.

51. The system of claim 48, wherein the historical mention information acquiring unit is further configured to acquire third numbers of times each first user name is mentioned in the first social network by the user and fourth numbers of times each second user name is mentioned in the second social network by the user, and use the third numbers of times and the fourth numbers of times as the historical mention information.

52. The system of claim 51, wherein the suggestion module comprises:
a first processing unit configured to obtain, according to the first correspondence and the second correspondence, a third correspondence between friends of the user and keywords of post content;
a second processing unit configured to extract a keyword of current post content from the current input information of the user, and obtain at least one candidate friend according to the keyword of the current post content and the third correspondence;
a third processing unit configured to:
according to the first correspondence, acquire the third numbers of times each first user name is mentioned in the first social network by the user, and the second numbers of times each second user name is mentioned in the second social network by the user, and obtain respective numbers of times each candidate friend is mentioned by the user; and
a suggestion unit configured to suggest, to the user according to the respective numbers of times each candidate friend is mentioned by the user, the at least one of the first user names corresponding to at least one of the at least one candidate friend.

53. The system of claim 32, wherein the response module comprises:
a historical mention information acquiring unit configured to acquire a second correspondence between environment information of historical post content and historical mentioned user names of the user on the first social network and the second social network, and use the second correspondence as the historical mention information.

54. The system of claim 32, wherein the response module comprises:
a historical mention information acquiring unit configured to acquire a second correspondence between environment information of historical post content and historical mentioned user names of the user on the second social network, and use the second correspondence as the historical mention information.

55. The system of claim 53, wherein the executable modules further comprise:
an environment information acquiring module configured to acquire current environment information of the user.

56. The system of claim 55, wherein the suggestion module is configured to suggest the at least one of the first user names in the first user name set to the user according to the first correspondence, the historical mention information, and the current environment information of the user.

57. The system of claim 56, wherein the suggestion module comprises:
- a first processing unit configured to obtain, according to the first correspondence and the second correspondence, a third correspondence between friends of the user and attributes of environment information;
- a second processing unit configured to extract an attribute of the current environment information, and obtain at least one candidate friend according to the attribute of the current environment information and the third correspondence; and
- a suggestion unit configured to suggest, to the user, the at least one of the first user names corresponding to the at least one candidate friend.

58. The system of claim 56, wherein the historical mention information acquiring unit is further configured to acquire third numbers of times each first user name is mentioned in the first social network by the user and fourth numbers of times each second user name is mentioned in the second social network by the user, and use the third numbers of times and the fourth numbers of times as the historical mention information.

59. The system of claim 58, wherein the suggestion module comprises:
- a first processing unit configured to obtain, according to the first correspondence and the second correspondence, a third correspondence between friends of the user and attributes of environment information;
- a second processing unit configured to extract an attribute of the current environment information, and obtain at least one candidate friend according to the attribute of the current environment information and the third correspondence;
- a third processing unit configured to:
  according to the third numbers of times the first user name is mentioned in the first social network by the user, the fourth numbers of times the second user name is mentioned in the second social network by the user, and the first correspondence, obtain respective numbers of times each candidate friend is mentioned by the user; and
- a suggestion unit configured to suggest, to the user according to the respective numbers of times each candidate friend is mentioned by the user, the at least one of the first user names corresponding to at least one of the at least one candidate friend.

60. A computer readable storage device, comprising at least one executable instruction, which, in response to execution, causes a device comprising a processor to perform operations, comprising:
- in response to a mention symbol input by a user in a first social network, acquiring a correspondence between a first user name set and a second user name set, and historical mention information of the user, wherein the first user name set comprises at least one first user name of a friend of the user in the first social network, and the second user name set comprises at least one second user name of the friend of the user in a second social network, wherein the historical mention information establishes a degree of intimacy between the user and the friend of the user, wherein the degree of intimacy is determined by counting a first number of times the user has mentioned the friend of the user on the first social network and the second social network and a second number of times the friend of the user has mentioned the user on the first social network and the second social network, and wherein the correspondence refers to the mention symbol and a user name following the mention symbol; and
- suggesting at least one first user name in the first user name set to the user according to the correspondence and the historical mention information.

61. A device, comprising a processor and a memory, the memory storing executable instructions, the processor being connected to the memory via a communication bus, and when the device operates, the processor executes the executable instructions stored in the memory to perform operations, comprising:
- in response to a mention symbol input by a user in a first social network, acquiring a correspondence between a first user name set and a second user name set, and historical mention information of the user, wherein the first user name set comprises at least one first user name of a friend of the user in the first social network, and the second user name set comprises at least one second user name of the friend of the user in another social network, wherein the historical mention information establishes a degree of intimacy between the user and the friend of the user, and wherein the degree of intimacy is determined based on counts of a first number of times the user mentions the friend of the user on the first social network and the second social network and a second number of times the friend of the user mentions the user on the first social network and the second social network, and wherein the correspondence refers to the mention symbol and a user name following the mention symbol; and
- suggesting at least one first user name in the first user name set to the user according to the correspondence and the historical mention information.

* * * * *